(12) United States Patent
Orange

(10) Patent No.: US 9,772,400 B2
(45) Date of Patent: Sep. 26, 2017

(54) SYSTEM AND METHOD FOR CALIBRATION OF ECHO SOUNDING SYSTEMS AND IMPROVED SEAFLOOR IMAGING USING SUCH SYSTEMS

(71) Applicant: Daniel L. Orange, Sacramento, CA (US)

(72) Inventor: Daniel L. Orange, Sacramento, CA (US)

(*) Notice: Subject to any disclaimer, the term of this patent is extended or adjusted under 35 U.S.C. 154(b) by 0 days.

(21) Appl. No.: 14/775,538

(22) PCT Filed: Mar. 14, 2014

(86) PCT No.: PCT/US2014/029597
§ 371 (c)(1),
(2) Date: Sep. 11, 2015

(87) PCT Pub. No.: WO2014/144970
PCT Pub. Date: Sep. 18, 2014

(65) Prior Publication Data
US 2016/0291140 A1    Oct. 6, 2016

Related U.S. Application Data

(60) Provisional application No. 61/786,521, filed on Mar. 15, 2013.

(51) Int. Cl.
*G01V 1/38* (2006.01)
*G01S 7/52* (2006.01)
*G01S 15/89* (2006.01)
*G01S 15/02* (2006.01)
*G01S 7/62* (2006.01)
*G01S 15/87* (2006.01)

(52) U.S. Cl.
CPC ........ *G01S 7/52004* (2013.01); *G01S 7/6263* (2013.01); *G01S 15/025* (2013.01); *G01S 15/87* (2013.01); *G01S 15/89* (2013.01)

(58) Field of Classification Search
CPC ........ G01S 15/89; G01S 15/025; G01S 15/87; G01S 7/6263; G01S 7/52004
USPC .......................................................... 367/68
See application file for complete search history.

(56) References Cited

U.S. PATENT DOCUMENTS 4,661,935 A    4/1987   Shock et al.
5,124,952 A    6/1992   Knize et al.
(Continued)

FOREIGN PATENT DOCUMENTS

WO    WO03/065073 A1    8/2003

OTHER PUBLICATIONS

International Search Report for PCT/US2014/029597, mailed Oct. 17, 2014, 4 pages.
(Continued)

*Primary Examiner* — Daniel L Murphy
(74) *Attorney, Agent, or Firm* — Eleanor Musick; Musick Davison LLP

(57) ABSTRACT

A system and method are provided for visualizing an offset in static parameters in an echo sounding system by generating a difference grid by subtracting a first survey line from a second survey line to determine difference values at each point in the grid; and displaying the difference grid on a display device, where the difference values are represented on a visual scale. The difference values may be used to calibrate the echo sounding system or check the quality of the calibration of an echo sounding system.

20 Claims, 28 Drawing Sheets
(19 of 28 Drawing Sheet(s) Filed in Color)

(56) References Cited

U.S. PATENT DOCUMENTS

| | | |
|---|---|---|
| 5,485,432 A | 1/1996 | Aechter et al. |
| 6,055,482 A | 4/2000 | Sudhakar et al. |
| 6,317,384 B1 | 11/2001 | Luo et al. |
| 2005/0197773 A1 | 9/2005 | Brewster et al. |
| 2006/0004519 A1 | 1/2006 | Humphrey et al. |
| 2009/0203954 A1 | 8/2009 | Gronemeyer et al. |

OTHER PUBLICATIONS

Collier, et al. "Correlation of sidescan backscatter with grain size distribution of surficial seabed sediments," Marine Geology 214 (2005) 431-449.

Kleusner, et al. "High density of structurally controlled, shallow to deep water fluid seep indicators imaged offshore Costa Rica," Geochem. Geophys. Geosyst., doi:10.1002/ggge.20058, vol. 14, No. 3, Mar. 6, 2013, 519-539.

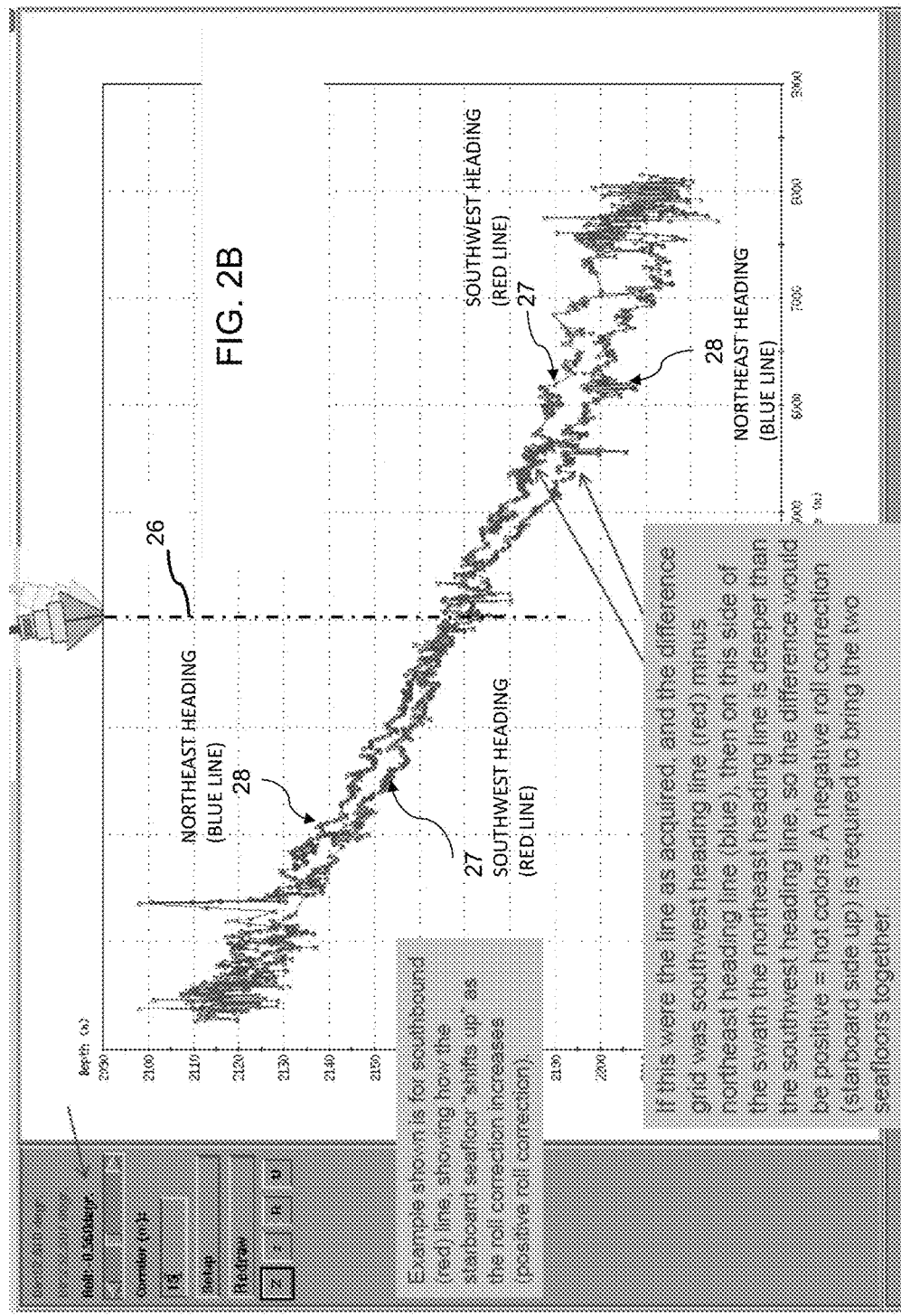

FIG. 3C

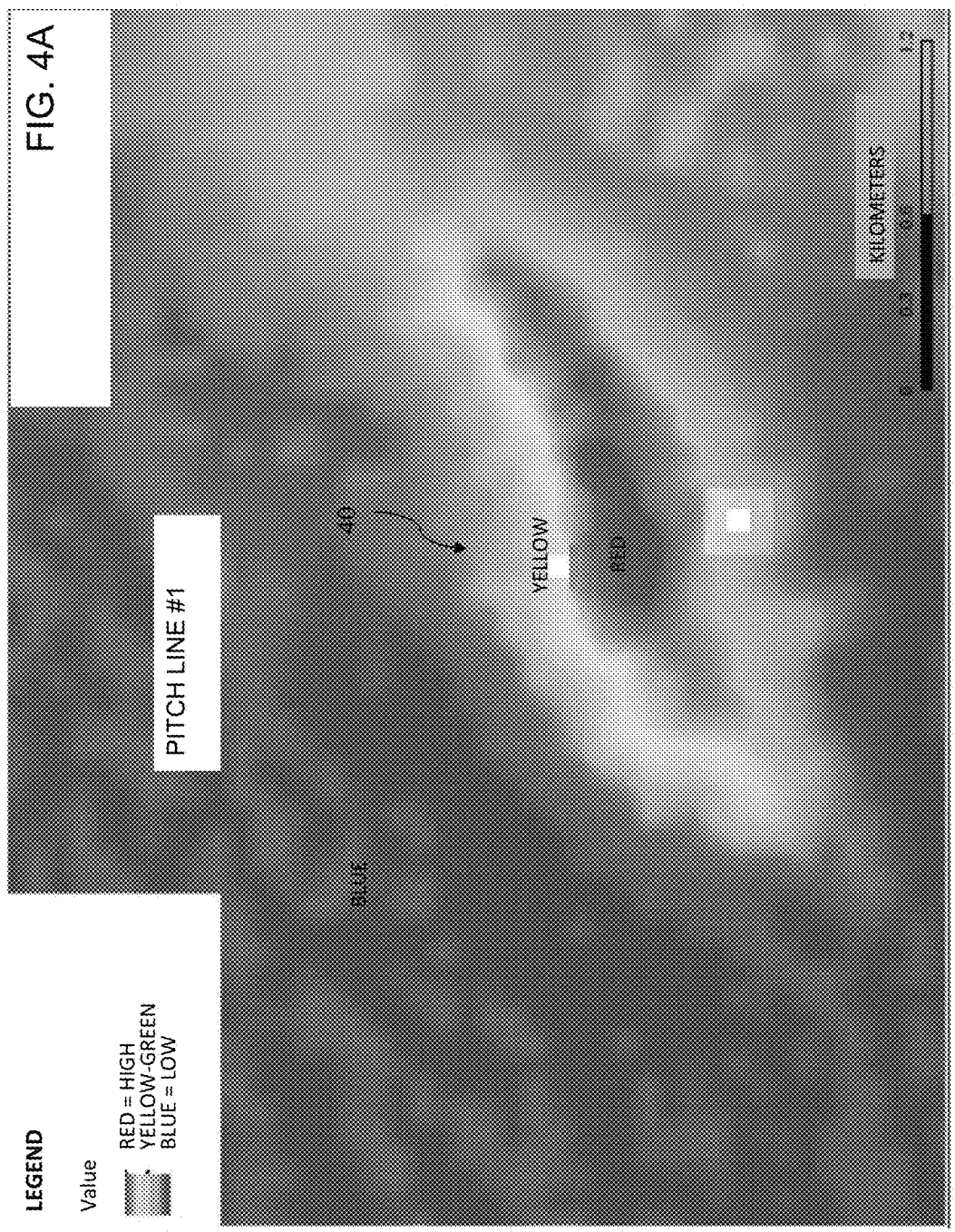

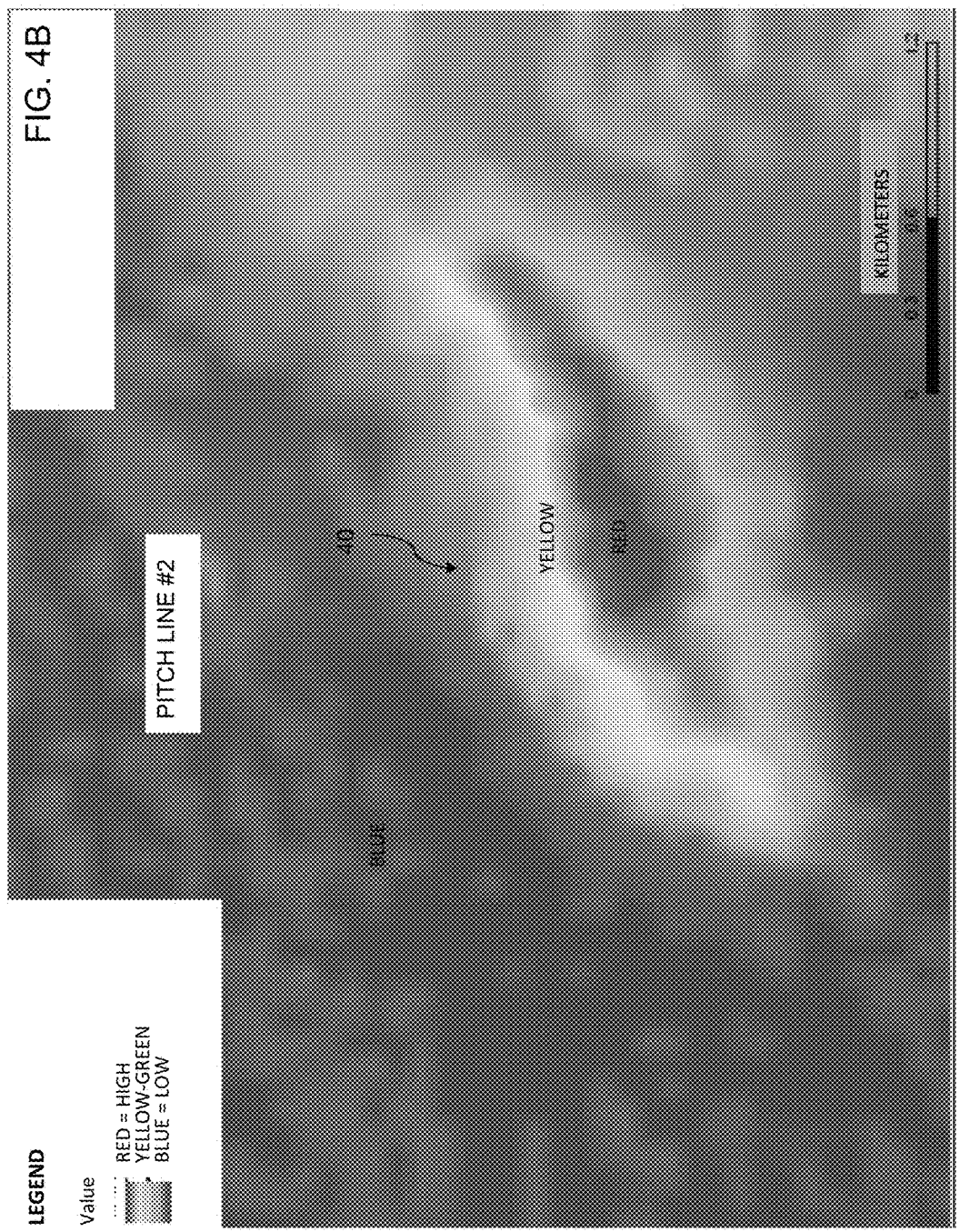

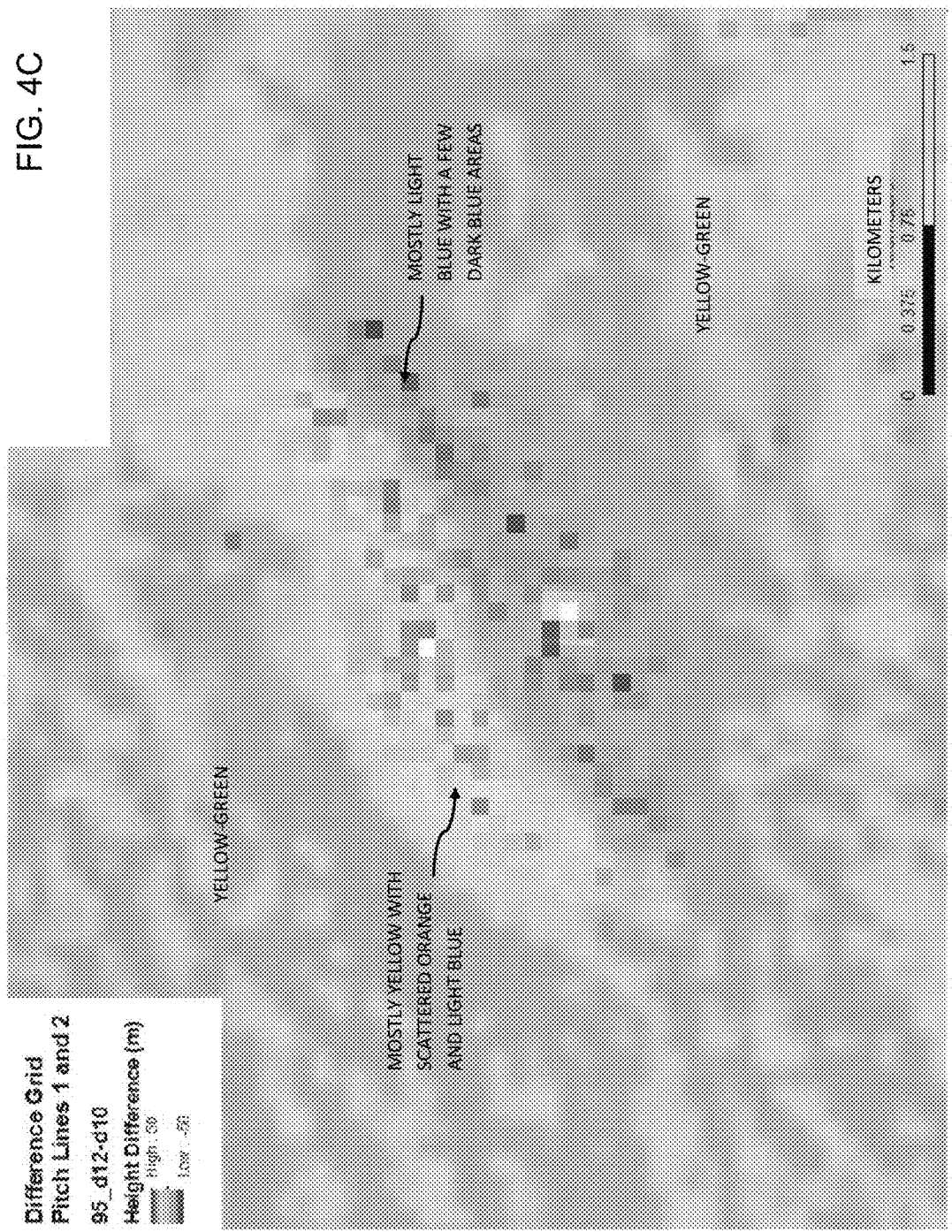

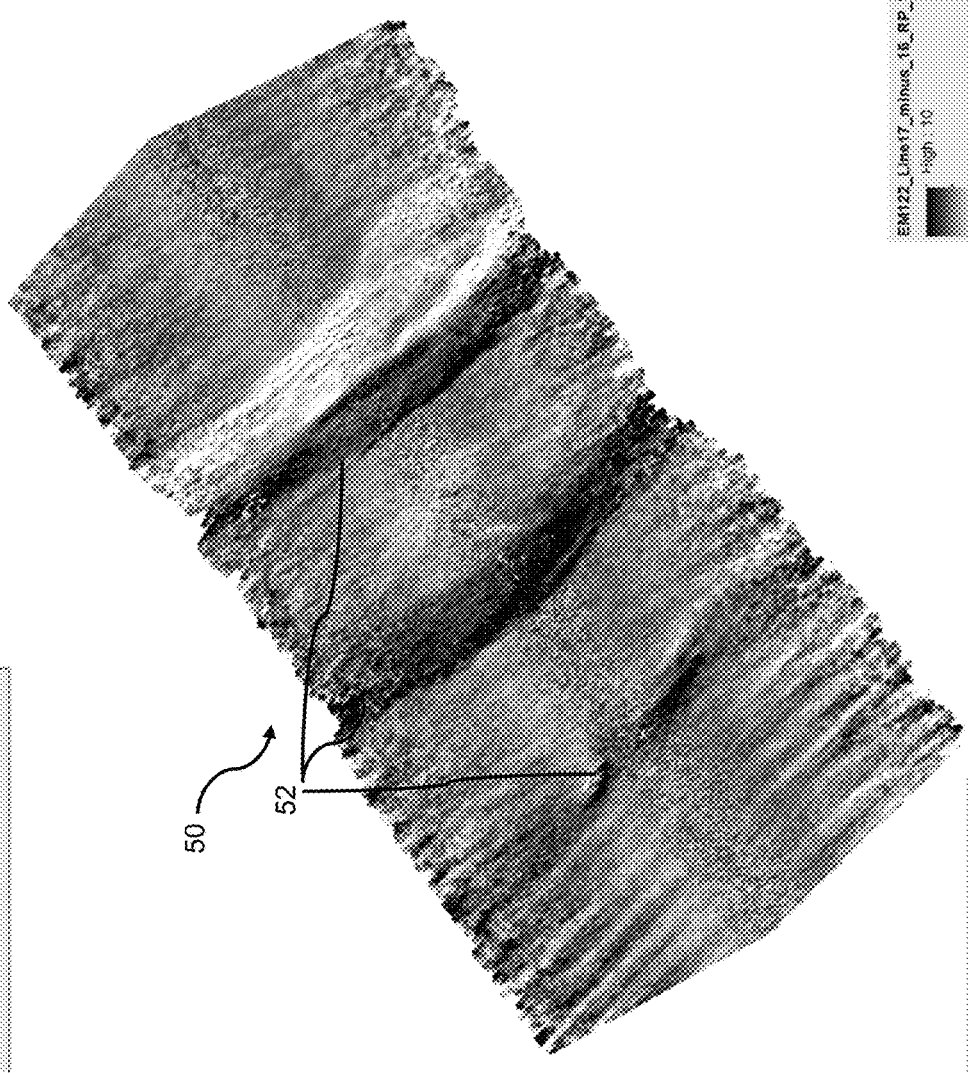

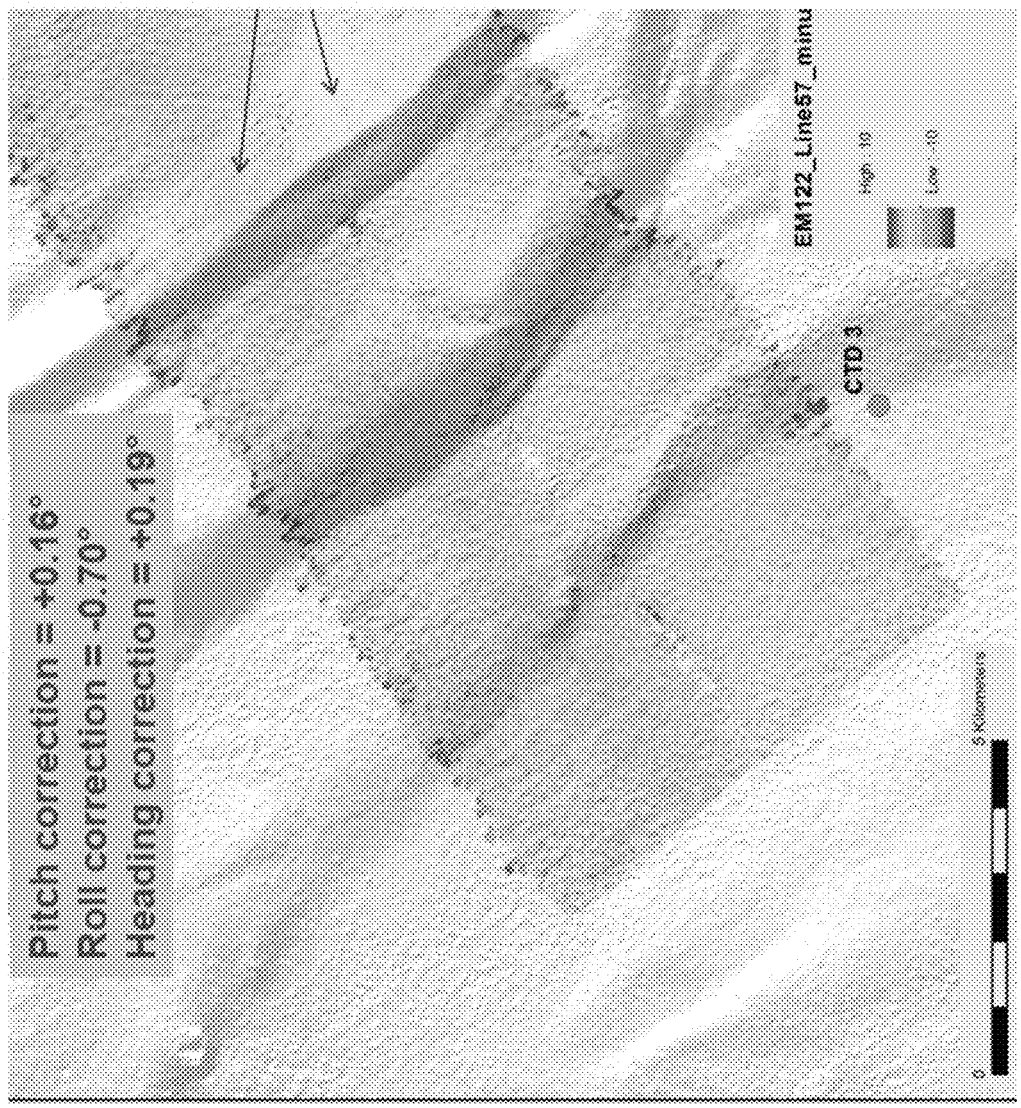

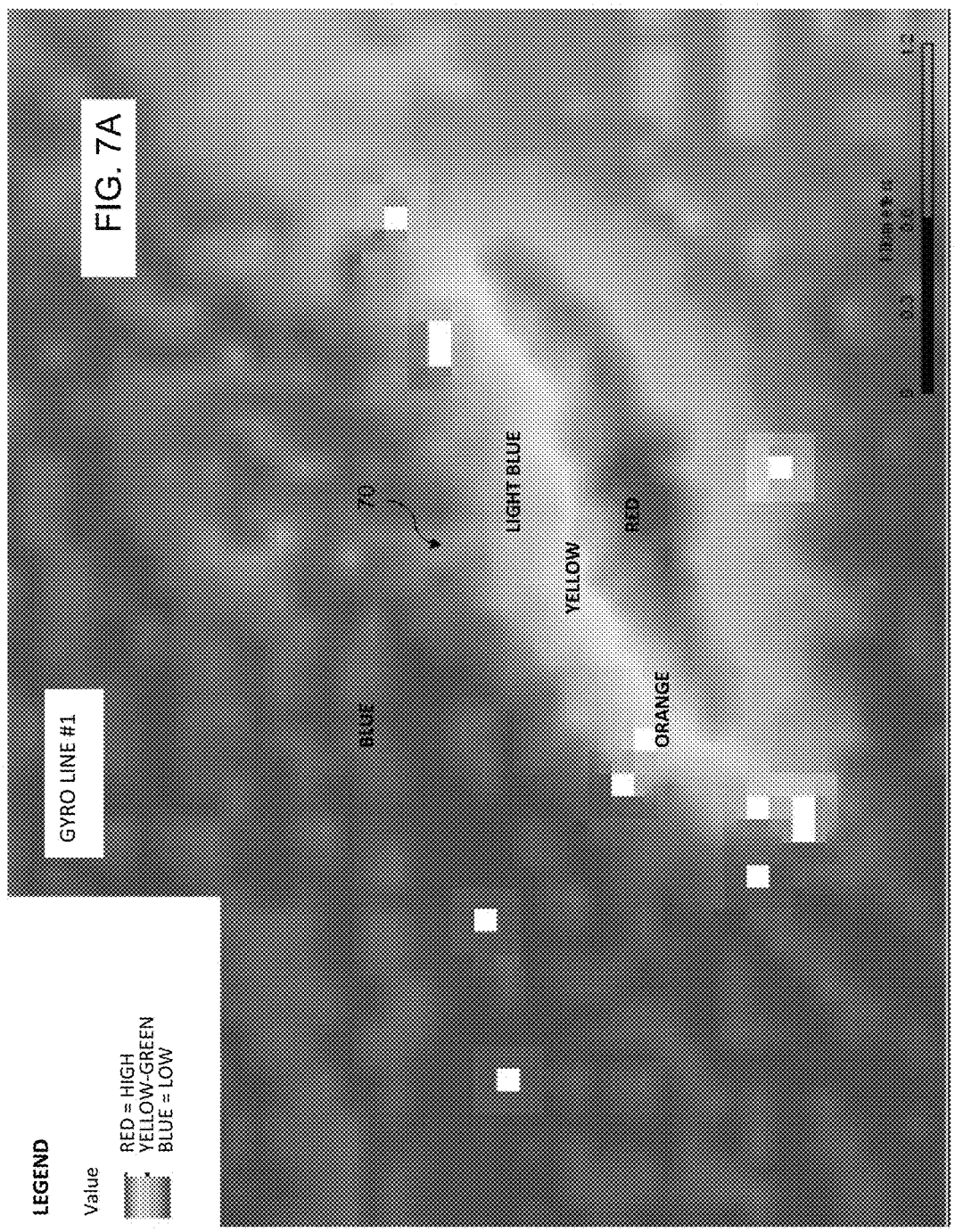

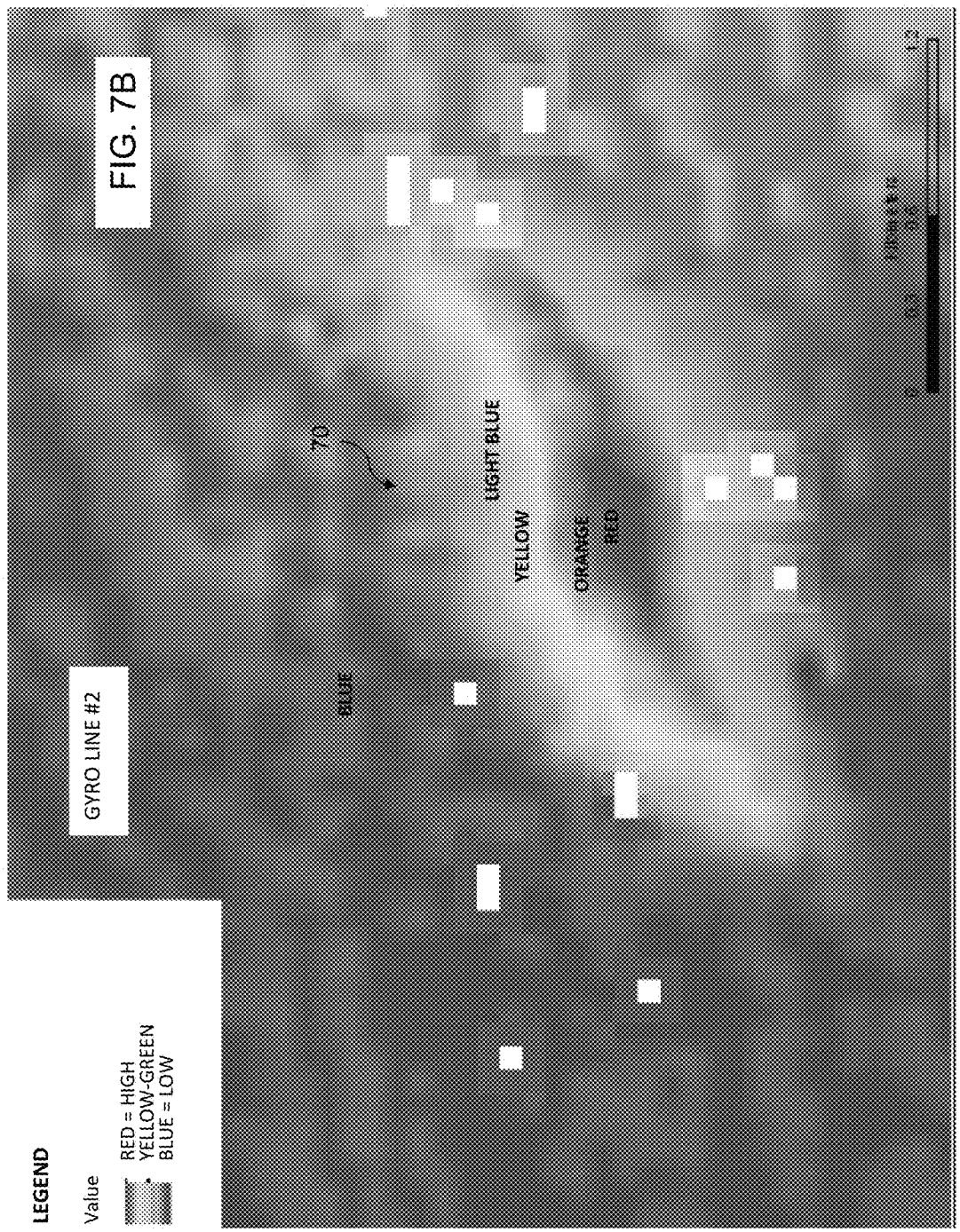

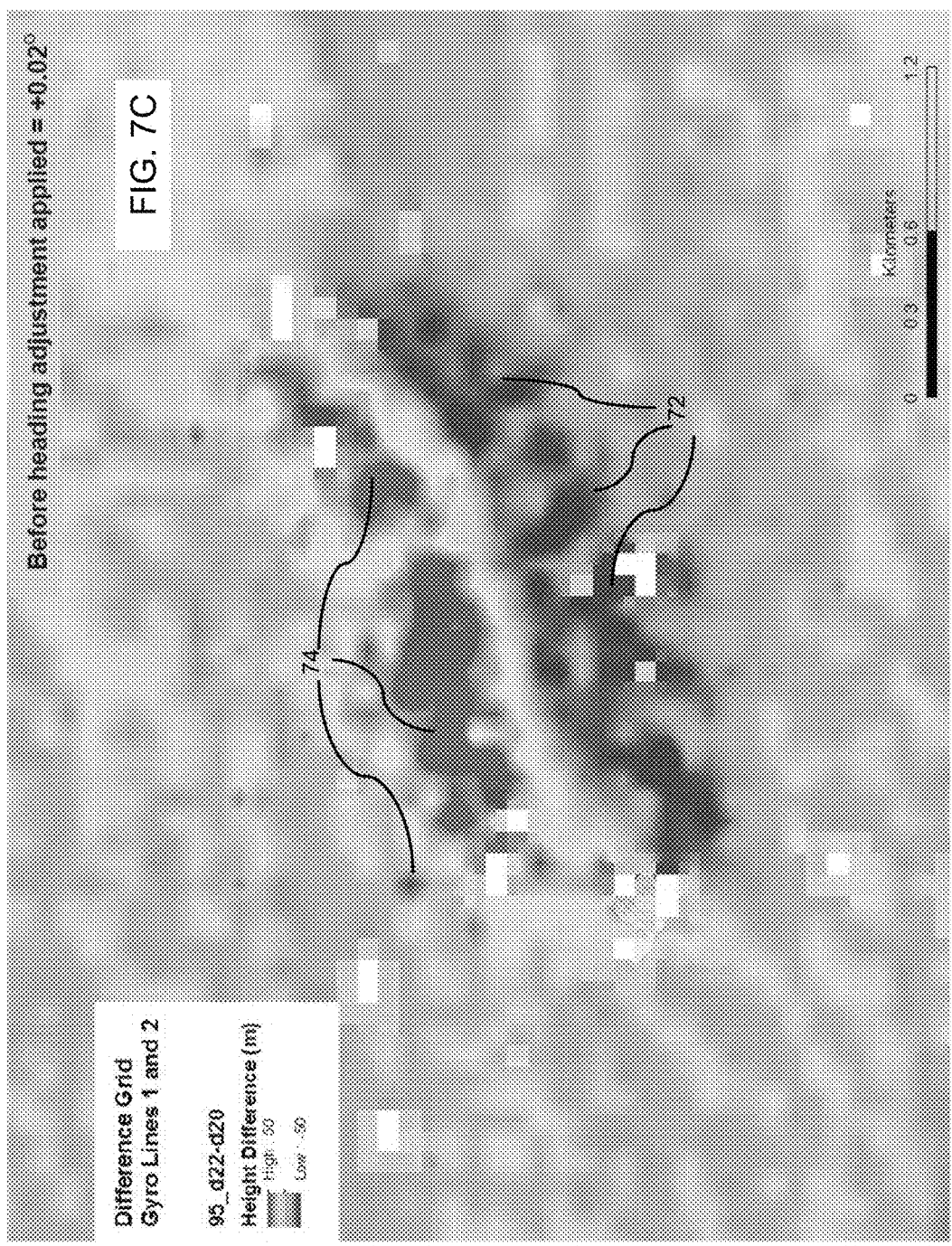

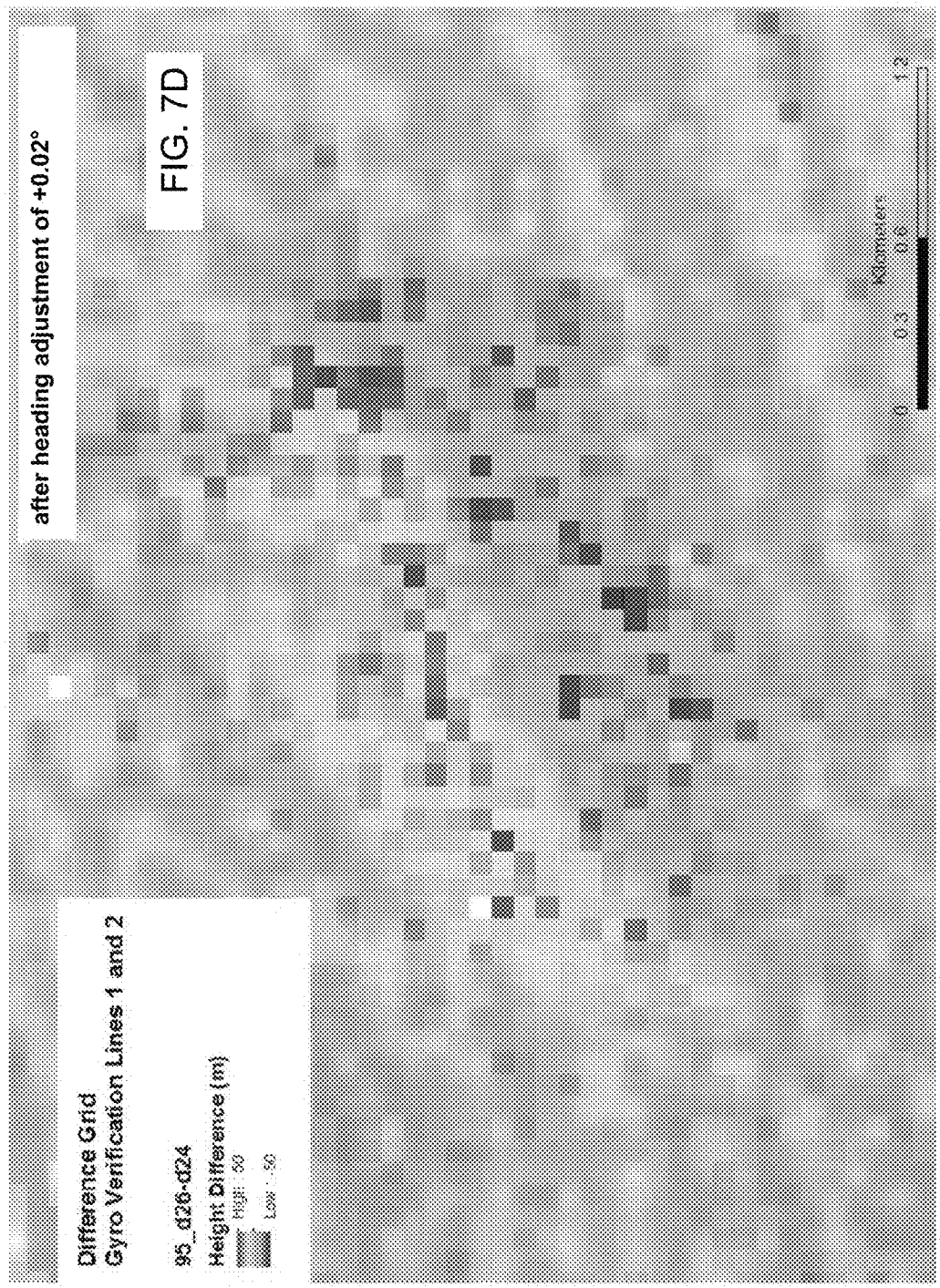

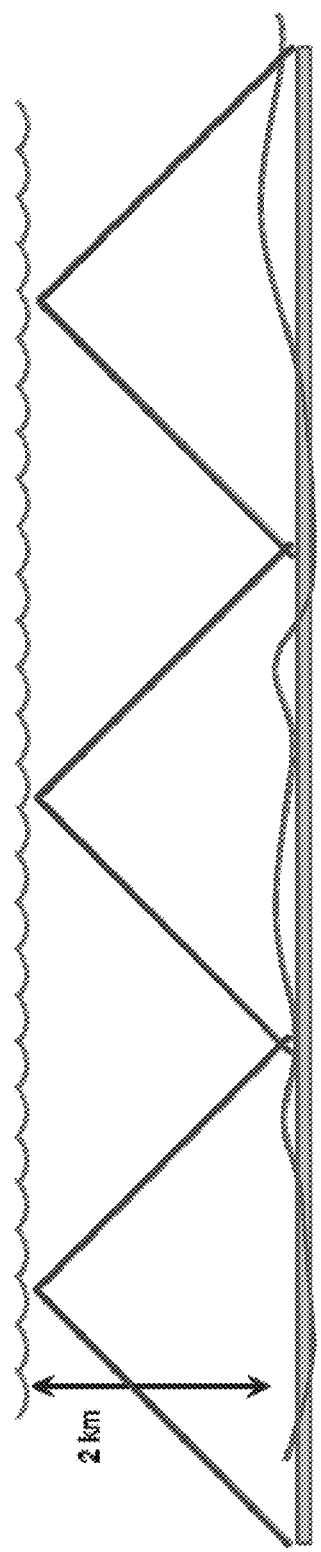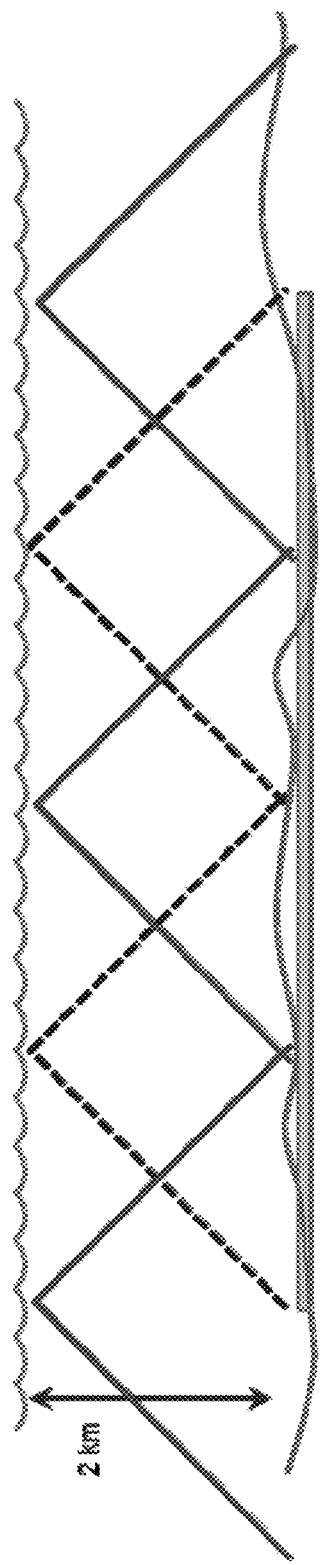

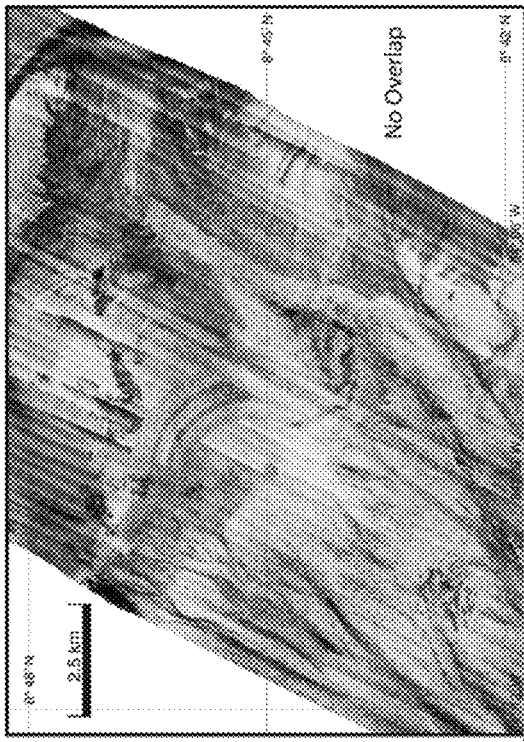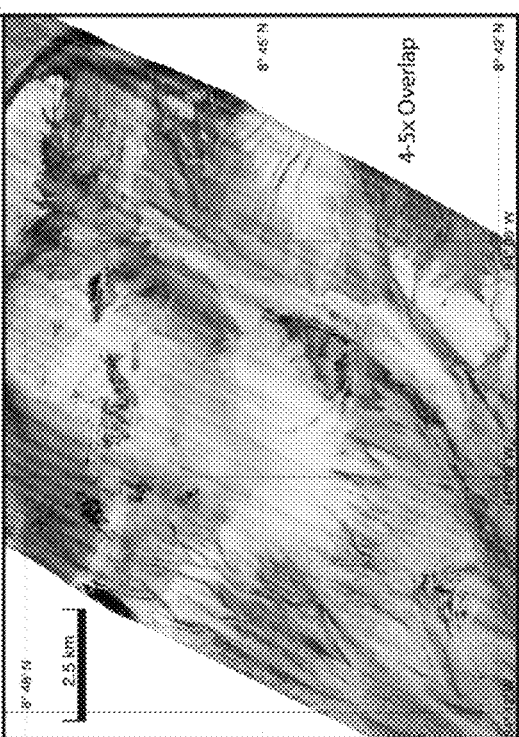

SYSTEM AND METHOD FOR CALIBRATION OF ECHO SOUNDING SYSTEMS AND IMPROVED SEAFLOOR IMAGING USING SUCH SYSTEMS

RELATED APPLICATIONS

This application is a 371 national stage filing of International Application No. PCT/US2014/029597, filed Mar. 14, 2014, which claims the benefit of U.S. Provisional Application No. 61/786,521, filed Mar. 15, 2013, the contents of which are incorporated herein by reference in its entirety.

FIELD OF THE INVENTION

The present invention relates to a system and method for improving the calibration and/or checking the calibration of acoustic imaging systems for mapping the floor of a body of water.

BACKGROUND OF THE INVENTION

Echo sounding systems, which are widely used for underwater imaging, work by transmitting a sound pulse or "ping" at a specific frequency, and then receiving that same pulse through a receiver. The received signal is input into a computer processor that determines how long it takes to receive the returning pulse. This delay is translated into depth. The processing system assigns a color range or grey scale for depth to create a 2D or 3D top-side model of the seafloor. U.S. Pat. No. 5,485,432 of Aechter et al., incorporated herein by reference, describes the components and procedures involved in acoustic imaging of the seafloor using a multibeam echosounder.

A typical echo sounding system for mapping the seafloor or the floor of any body of water includes transducers for transmitting and receiving acoustic energy and a set of instruments that measure the location and the orientation of the transducers. Typically, the transducers are mounted on a ship or boat, but they may also be attached to a tow fish or autonomous underwater vehicle. In order to acquire accurate soundings from the seafloor, the instruments that measure the orientation, i.e., the three orthogonal components pitch, roll, and heading, must be corrected for static biases that are introduced by vehicle movement, misalignment and asymmetry in the positioning of the transducers.

The common approach to minimize static biases and calibrate echo sounding systems is known as the "patch test" (Godin, 1996, 1998). During a patch test, the ship (or platform) acquires sets of reciprocal or offset lines over a slope ("bounded slope") or an object. Cross-sections (profiles) of the surveyed area are represented as curves on depth-distance plots. The plotted curves corresponding to the reciprocal survey lines are overlaid to provide a visual indication of a bias in the orientation, where offsets between the two curves are indicative of a static bias. There are four variables that are typically measured for calibration: time delay, pitch, roll and heading, listed in the order in which they are usually measured. Both time delay and pitch measurement include a 10-20° slope in the seafloor with a flat surface on each side. If offsets exist, the soundings of the slope will shift for reciprocal directions (pitch) or with two lines acquired in the same direction, with the same center line, but at different speeds (time delay). Roll measurement is conducted on a flat bottom in order to indicate the offset between the port and starboard outer beams on reciprocal lines acquired with the same center line but in opposite directions. Roll offset will be shown as a change in sounding height on the same side of the swath for each direction. Heading requires a discrete object or slope in the outer beams of two separate survey lines. If an offset is present, it will be appear as a shift in the object's position. Commercially-available software tools such as Seafloor Information System (SIS) from Kongsberg Maritime (Norway) and HIPS/SIPS from CARIS (New Brunswick, Canada) provide user interfaces that assist in visualization and processing of acoustic data and may be used to calculate offsets. The user enters a correction and observes whether the offset improves or degrades the alignment of the curves, and thus iterates toward a solution.

An alternative technique described in International Patent Publication WO2003/065073 of Bjorke, incorporated herein by reference, uses a quantitative error minimization of the seafloor in common between two surveyed lines.

Both the patch test and the quantitative error minimization approach of Bjorke are limited by the noise inherent to any acoustic surveying system. This noise will limit the ability to achieve a calibration because the user reaches a point at which the size of the correction is less than the scale of the scatter of the soundings. A wider corridor, which increases the number of soundings, also increases the number of noisy soundings. A quantitative correction will also be limited by soundings.

BRIEF SUMMARY

The present invention addresses the noise limitations of the prior art by providing a method of visualizing static biases with a high level of sensitivity. Using bathymetric grids visualized using standard color-coded or grey scale images generated by a conventional echo sounding system, the inventive method calculates and displays a difference surface from the seafloor as surveyed by the same vehicle in two different directions, i.e., reciprocal survey lines, over a feature on the seafloor. The difference grid is created by subtracting the depths of all areas of the seafloor that are common from one survey line from the second. If the position and orientation systems are perfectly calibrated, the resulting difference surface will be a null (zero height) surface, producing an image that is uniform across the seafloor area. However, if any part of the orientation system has a static bias that should be corrected, the difference surface will show a pattern, with different patterns indicative of the different components that need to be corrected. By using the power of the human eye, and the pattern recognition power of the human brain, a user can "see through" noise to recognize a diagnostic pattern, thereby allowing the user to iterate toward a more accurate calibration than can be achieved with prior art methods alone.

The present invention can be used as a Quality Control (QC) tool to test the quality of an echo sounder's calibration. If all of the static bias corrections to the orientation system are perfect, the difference surface of two survey lines acquired in different directions over a feature will be a null (zero height) surface. Any deviation from a perfect calibration will result in a difference pattern. The present invention thus provides a powerful QC aid to confirm a calibration obtained by either a Patch Test or a Quantitative "automatic" correction.

In one aspect of the invention, a method is provided for visualizing an offset in static parameters in an echo sounding system by: generating a difference grid by subtracting a first survey line from a second survey line to determine difference values at each point in the grid in common; and displaying the difference grid on a display device, where the difference values are represented on a visual scale. In one implementation, the second survey line is taken at an opposite heading from the first survey line. In another implementation, the second survey line is taken at the same heading and a different speed than the first survey line.

In another implementation, the second survey line is laterally offset from the first survey line and taken at the same heading as the first survey line, so that outer beams of the first survey line overlap outer beams on the opposite side of the second survey line. For example, the port-side beams of the first line overlap with the starboard-side beams of the second line. The visual scale may be a color scale or a grey scale.

In another aspect of the invention, a non-transitory machine-readable medium comprising a plurality of instructions is provided, which in response to being executed result in a computing system receiving echo sounding data corresponding to each of a first survey line and a second survey line; generating a difference grid by subtracting the first survey line from the second survey line to determine difference values at each point in the grid; and displaying the difference grid on a display device, where the difference values are represented on a visual scale.

In another aspect of the invention, a non-transitory machine-readable medium comprising a plurality of instructions is provided, which in response to receiving an input comprising a static offset results in a computing system re-calculating the receiving echo sounding data corresponding to each of an adjusted first survey line and an adjusted second survey line; and generates an adjusted difference grid by subtracting the adjusted first survey line from the adjusted second survey line to determine difference values at each point in the grid; and displaying the difference grid on a display device, where the difference values are represented on a visual scale. In one implementation, the second survey line is taken at an opposite heading from the first survey line. In another implementation, the second survey line is taken at the same heading and a different speed than the first survey line. In another implementation, the second survey line is laterally offset from the first survey line and taken at the same heading as the first survey line, so that outer beams of the first survey line overlap outer beams on the opposite side of the second survey line. The visual scale may be a color scale or a grey scale.

In still another aspect of the invention, a system for visualizing an offset in static parameters in an echo sounding system is provided, where the system includes a processor in communication with a plurality of acoustic sensors, the processor adapted for executing a program to convert signals from the acoustic sensors into depth values, the processor further adapted for: receiving echo sounding data from the plurality of acoustic sensors corresponding to each of a first survey line and a second survey line; generating a difference grid by subtracting the first survey line from the second survey line to determine difference values at each point in the grid; and displaying the difference grid on a display device, where the difference values are represented on a visually-distinguishable scale.

In a further aspect of the invention, a method is provided for increasing the resolvability of an echo sounding system by acquiring multiple survey lines to produce overlapping swaths of seafloor data. Adjacent survey lines of the multiple survey lines may have a line offset that is less than a swath width. Alternatively, or in combination, the multiple survey lines may be acquired on multiple different headings to generate overlapping swaths of seafloor data. The method may further comprise acquiring the multiple survey lines at reduced acquisition speed to increase the sounding density along-track. The seafloor bathymetric data may be binned at progressively smaller bin sizes with progressively more overlap to further improve resolvability. The seafloor backscatter data may be mosaiced at progressively smaller pixel sizes with progressively more overlap to further improve resolvability.

Still another aspect of the invention provides a method for locating an object of interest on the seafloor using an echo sounding system, where the method comprises acquiring multiple survey lines to produce overlapping swaths of seafloor data. Adjacent survey lines of the multiple survey lines may have a line offset that is less than a swath width. Alternatively, or in combination, the multiple survey lines may be acquired on multiple different headings to generate overlapping swaths of seafloor data. The method may further comprise acquiring the multiple survey lines at reduced acquisition speed to increase the sounding density along-track. The seafloor bathymetric data may be binned at progressively smaller bin sizes with progressively more overlap to further improve resolvability. The seafloor backscatter data may be mosaiced at progressively smaller pixel sizes with progressively more overlap to further improve resolvability.

The patent or application file contains at least one drawing executed in color. Copies of this patent or patent application publication with color drawing(s) will be provided by the Office upon request and payment of the necessary fee.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present invention will be better understood from the following detailed description of some preferred embodiments of the invention, taken in conjunction with the accompanying drawings, in which like numbers correspond to like parts, and in which:

FIG. 2B is a screen shot of a display produced using the prior art corridor-based method for the same static offset indicated in FIG. 2A.

FIG. 3C is the difference grid generated by subtraction of the survey lines of FIGS. 3A and 3B.

FIGS. 5A and 5B provide examples of difference grids used to test for pitch offset, before and after adjustment, respectively.

FIGS. 6A and 6B provide examples of difference grids before and after correction for heading bias.

FIGS. 7A and 7B illustrate a target surveyed in the opposite outer beams of offset survey lines; FIGS. 7C and 7D are the difference grids for the survey lines of FIGS. 7A and 7B before and after heading adjustment, respectively.

FIGS. 10A-10E are diagrams of exemplary multibeam survey geometries for fixed swath high resolution imaging, where FIG. 10A shows geometries for 4× and 5× surveys; FIG. 10B shows the geometry of a 1× survey (minimal overlap); FIG. 10C shows the geometry of a 2× survey (i.e.: the seafloor of interest is imaged by two different swaths, with the exception of the survey boundaries, which are only surveyed by one); FIG. 10D shows a 3× survey geometry and FIG. 10E illustrates a 6× survey geometry.

FIGS. 11A and 11B are backscatter images of a seafloor region with no swath overlap and 4-5 times overlap, respectively.

DETAILED DESCRIPTION

For purposes of the present description, the following definitions will be used:

"Vehicle" means any ship, towfish, autonomous underwater vehicle (AUV), submarine, boat, barge, raft, etc. that can be used to acquire echo sounding data.

"Seafloor" means the ocean floor or the bottom of any body of water, natural or man-made (lake, river, stream, harbour, ocean, canal, marina, etc.)

Figure 1:
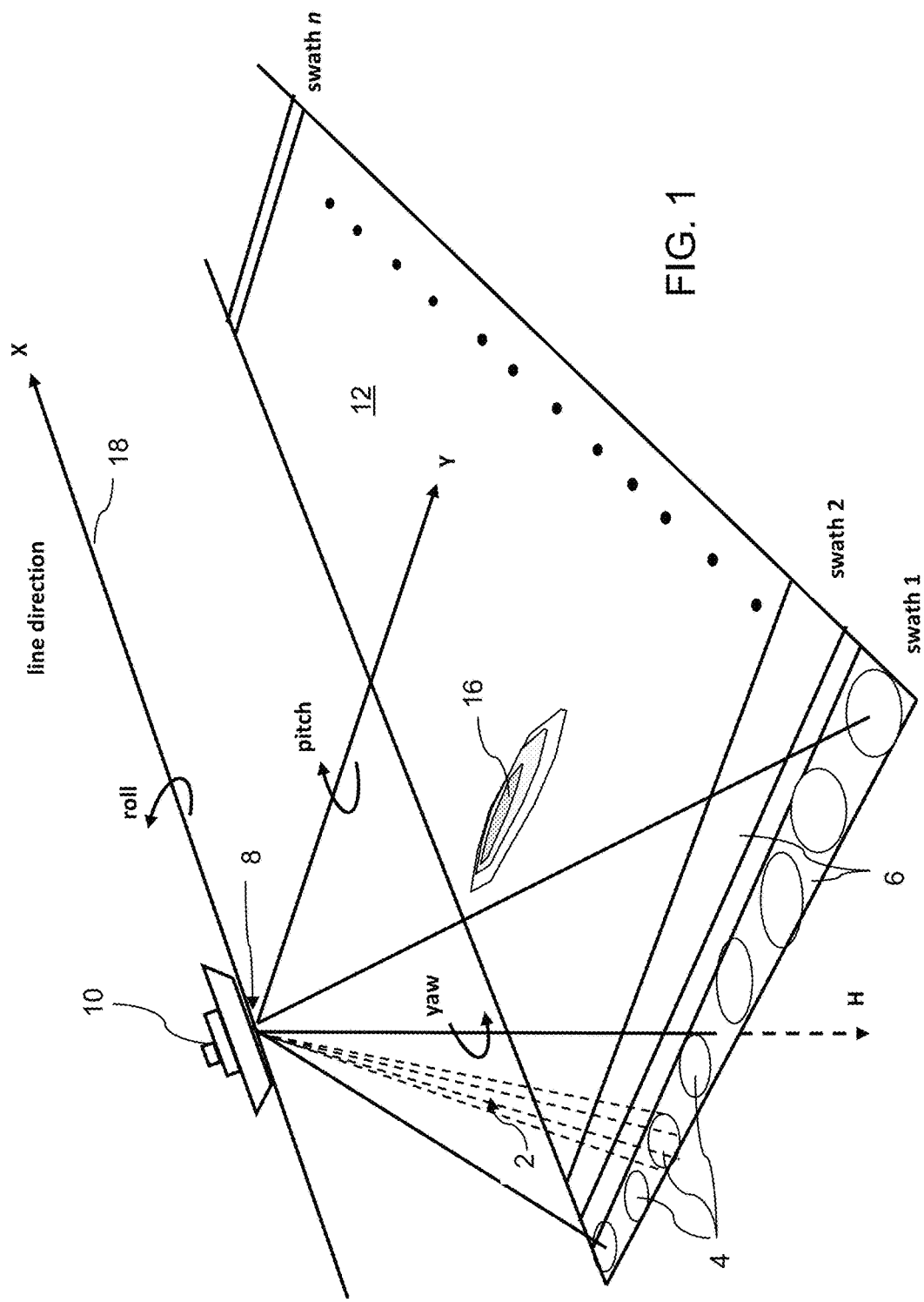
FIG. 1 illustrates the general layout and elements of an acoustic survey.

FIG. 1 illustrates the basic elements of an echo sounding measurement. A vehicle 10 moves along a direction X while making echo sounder measurements of the seafloor 14. In a multibeam technique, an acoustic array mounted parallel to the length of the ship transmits acoustic energy in a fan-shaped pattern 2, narrow along-track and broad across-track (swath 1). A second acoustic array, perpendicular to the first and mounted athwartship, receives acoustic signals from a fan-shaped area that is narrow across-track, and elongate along-track. The area of the seafloor in common between the transmitted energy and receive geometry is the "beam" or "footprint" 4. The receive array can detect multiple beams across track in different directions to form a "fan" transverse to the X direction. The collection of footprints/rays per swath may be within the range of 80 and 260. The different rays 2 are produced by different transducers in a transducer array 8 arranged preferably at the bottom of the vehicle 10. The transducer array position defines an origin of coordinates X, Y and H.

The transducer array 8 fires pings to cover successive swaths 6 as the vehicle advances along the X direction. As will be recognized by those of skill in the art, parameters such as footprint diameter and swath width will vary based on a number of conditions. As the vehicle 10 completes a predetermined survey distance along the X direction, a survey line 12 is generated as a collection of all successive swaths 6, i.e., swath 1 to swath n.

The present invention assumes that the vehicle and its sensors have been configured using industry best practices as described by Herlihy et al. (1989), Godin (1996, 1998), and Mann (1998). Specifically, the transducers have been surveyed in to a high level of accuracy and the location and orientation of all components of the vessel position and orientation system (including but not limited to one or more each of the following: satellite navigation systems, motion reference units (MRUs), gyrocompasses, heave compensators, etc.) have been surveyed in to a high level of accuracy. Furthermore, the user has obtained recent and high quality measurements of the speed of sound throughout the water column so that the acoustic soundings can be corrected for refraction in the water column. For backscatter (the strength of the return acoustic signal) the user has also obtained salinity (conductivity) and temperature data through the water column so that the absorption of acoustic energy for the frequency of interest can be calculated for the entire water column and a correction applied to the return signal energy.

The user acquires echo sounding data to identify a feature on the seafloor. Feature 16 shown in FIG. 1 provides an example. Feature 16 should optimally have a distinctive shape, and should optimally be elongate, with a length much greater than its width, in a direction across the seafloor, and should extend for about half the total achieved swath in the water depth of interest. Furthermore, the optimal test location will also have a portion of the seafloor that is relatively flat and nearby the feature of interest. "Nearby" in this case is governed by the time it takes to survey from the feature of interest to the relatively flat seafloor. Ideally, nearby would mean less than 30-45 minutes away.

According to the inventive method, the vehicle 10 moves to acquire a first survey line of data along a line 18 that extends over the feature of interest and onto the relatively flat seafloor. The orientation of the survey line 18 would optimally be perpendicular to a line extending along the length of the feature of interest 16. Once this line has been completed, the vehicle 10 is moved, preferably immediately, to acquire a second, reciprocal survey line which follows the first survey line, but moves in the opposite direction. Each survey line produces a corresponding surface representing the measured depths. Using conventional echo sounding methods, the depths are represented on a color scale running from blue, corresponding to greater depths, to red, for shallower depths. In some echo sounding systems, the depths will be represented in grey scale. A difference survey (or difference grid) is a virtual surface generated by subtracting the seafloor at each point of the surface in common between the first survey line and the second survey line. Briefly, using known computer vision methods, the subtraction process involves comparison of the difference values (color or grey scale) for each pixel in the image. A pixel having the same depth value in the images at the same location in both the first and second survey lines will result in a zero value at that location. Where a non-zero value results from the pixel subtraction, the resulting difference value will be displayed at the corresponding location within the difference grid.

Figure 2A:
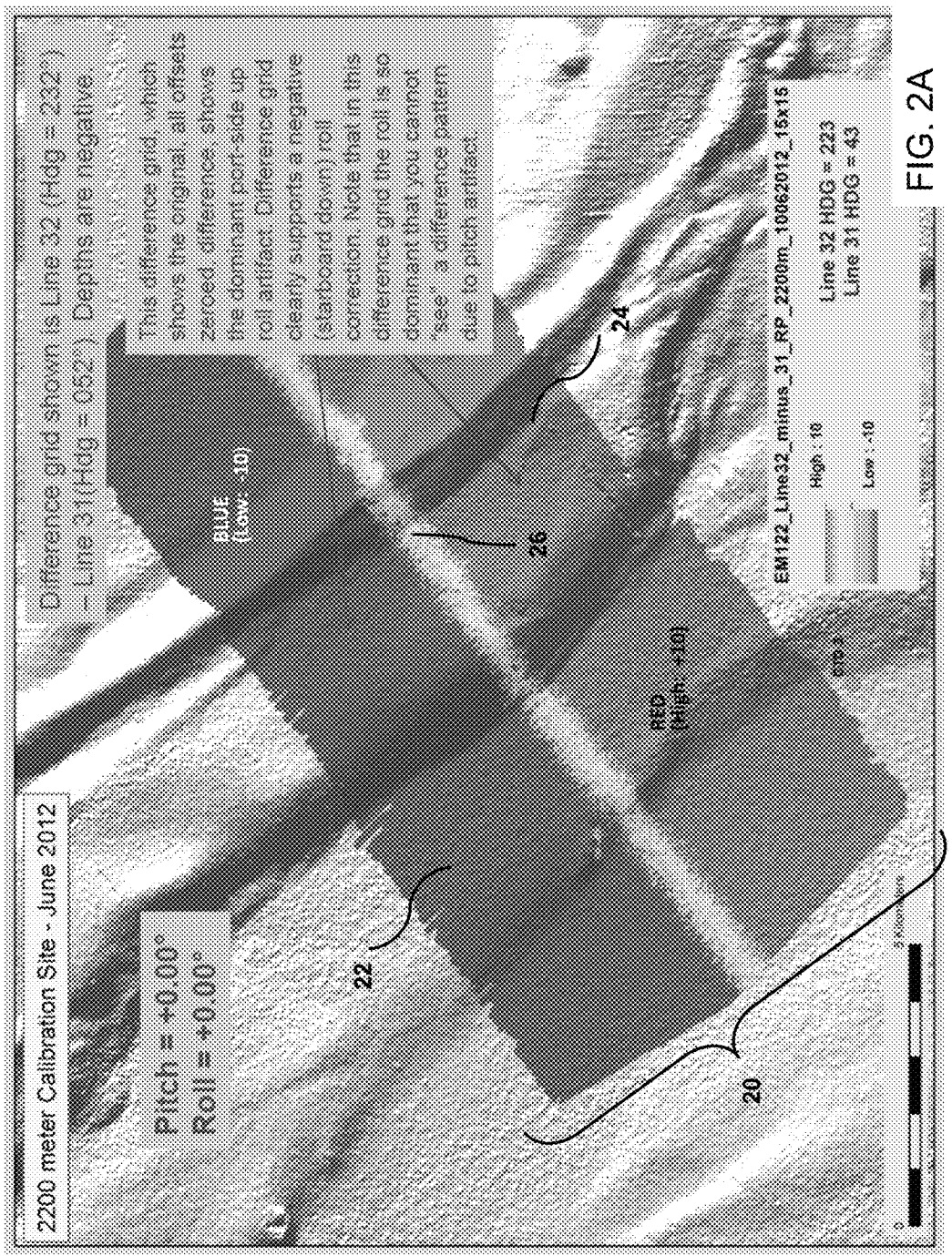
FIG. 2A is a sample difference grid indicating a static roll bias.

FIG. 2A illustrates a sample difference grid 20 of the seafloor surveyed in common by two survey lines taken at headings 43° (first survey line) and 223° (second survey line), i.e., opposite (or reciprocal) headings. The example represents the presence of a significant static roll bias, in which one side of the difference grid shows "high" (positive) values, whereas the other side indicates "low" (negative) values that are symmetric about the sail line 26. In particular, the upper portion 22 of the difference grid corresponds to strong a negative value, indicating a port-side up roll artefact. On a scale of −10 to +10, this portion of the difference grid would appear as a −10, which would typically be displayed on a color scale as blue, but is illustrated here as dark grey. The sail line 26 corresponds to a value of 0, and would appear as a yellow-green area in a color image. The lower portion 24 of the grid, which is shown as light grey to allows the colors to be distinguished in a grey scale image, would typically be displayed as red in a color image, corresponding to a difference of +10 m (or more) on the numerical scale. This pattern will be similar, but with the "hot" and "cold" colors on opposite sides, if the user has depths as positive values; the actual color pattern is a function of which line is subtracted from which, and whether depths are negative values or positive. The user can use the height difference of the difference survey at a known offset angle and depth to calculate a correction, or the user can enter a correction value into a real-time calibration routine capable of correcting both surfaces to observe whether the difference grid improves (both high and low values decrease at a given offset) or degrades (both high and low values increase at a given offset). In the example, a starboard up roll correction should be made (negative roll correction in a right-hand-rule sign convention). Elimination of the roll bias would be indicated when the difference grid has a uniform mid-scale value (yellow-green on a color scale) on either side of the sail line.

To provide a comparison to determining offset using a conventional swath corridor-based approach, FIG. 2B represents a screen shot of profiles of reciprocal lines 27 and 28 corresponding to the difference grid of FIG. 2A. In the example, the arrows indicate the locations corresponding to the survey line as acquired. For a difference grid subtracting the northeast heading line 28 from the southwest heading line 27, at the right side of the swath, the northeast heading line 28 is deeper than the southwest heading line 27, resulting in a positive difference height in meters, displayed on a color scale as hot colors (red, orange, yellow), corresponding to area 24 of the difference grid in FIG. 2A. The left side of the swath, where the northeast heading line 28 is shallower than the southwest heading line 27 will be indicated as a negative difference and displayed as cool colors (blue, green), corresponding to area 22 in FIG. 2A. Sail line 26 intersects the point at which the two heading lines cross.

The sample difference grid of FIG. 2A indicated such a strong roll bias that static biases in pitch and heading, if any, could not be seen. Static corrections applied in a calibration algorithm cannot perfectly recreate what happens in actuality. Therefore, a roll correction would generally be made to remove the greatest magnitude of the difference in the difference grid before attempting to check for the presence of and correct other biases. In this example, a roll correction of −0.70° was made, resulting in the difference grid shown in FIG. 5A, thus allowing pitch and heading offsets to be determined, as described below.

Figure 3A:
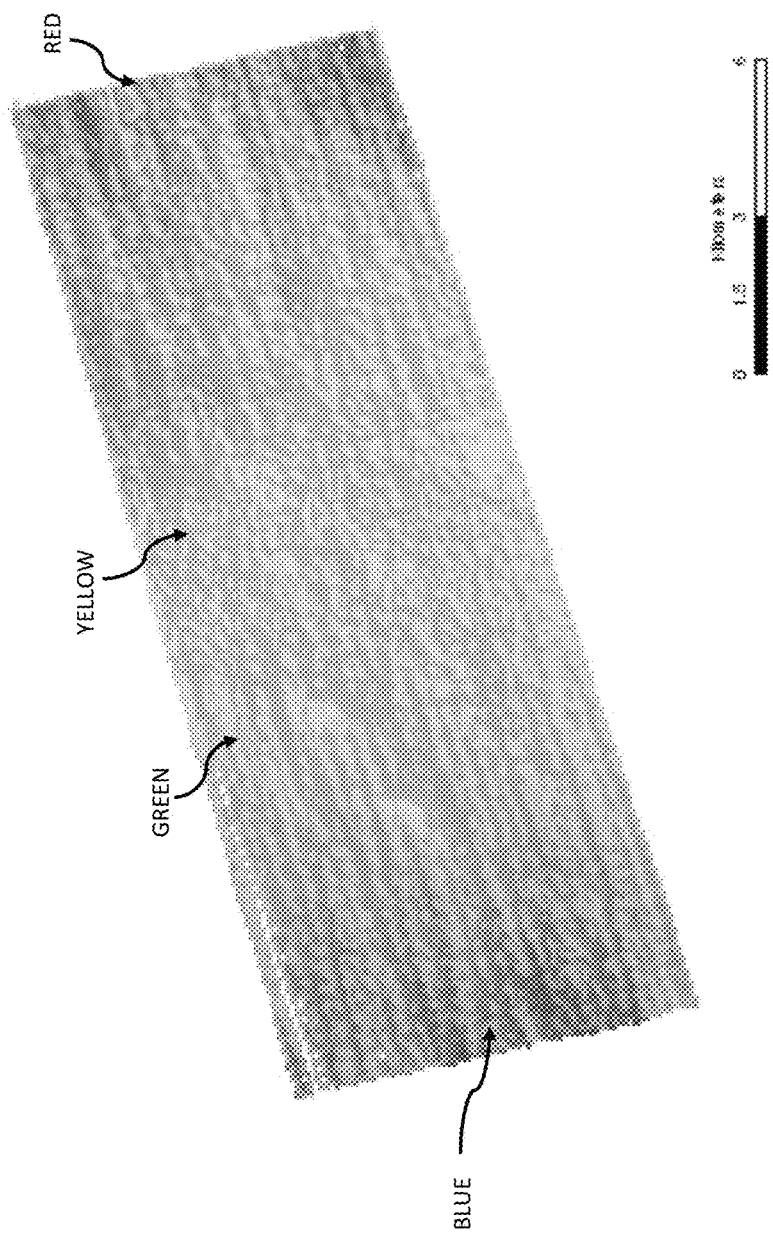
FIGS. 3A and 3B provide images of the reciprocal survey lines to be used in a roll calibration.
Figure 3B:
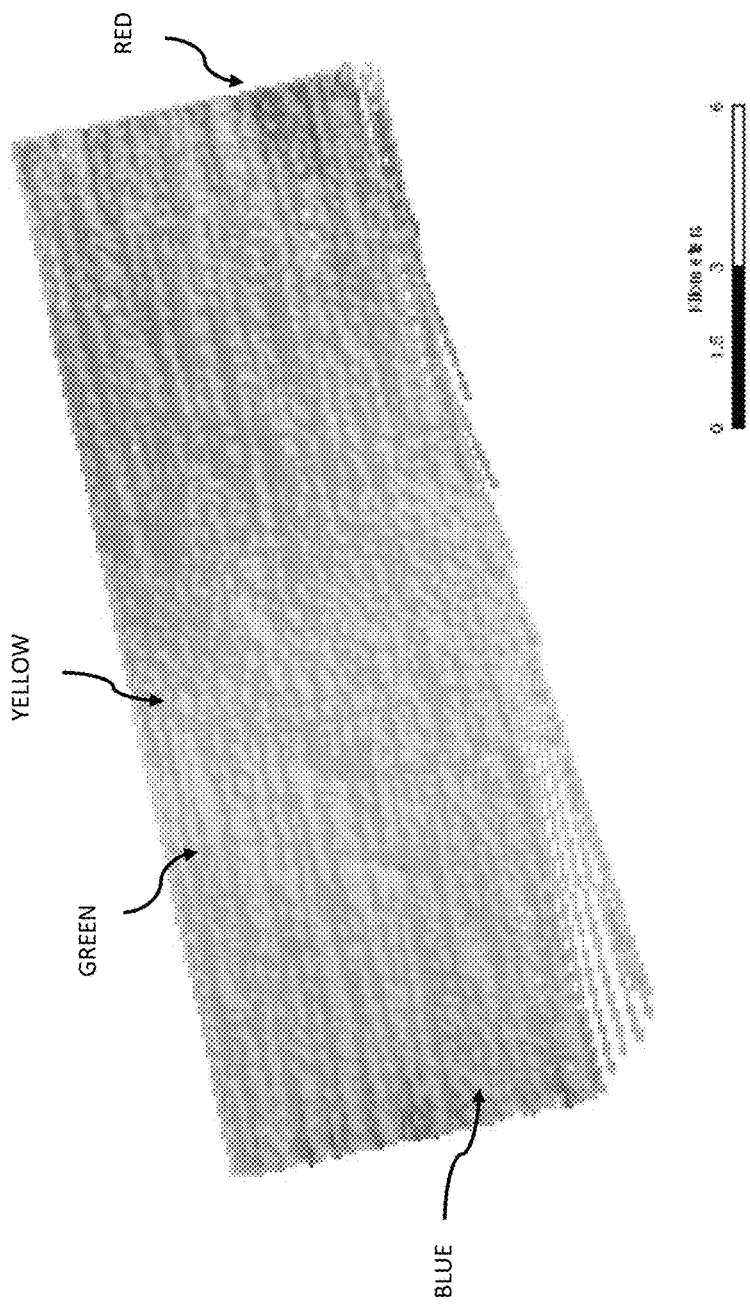
Figure 3C:
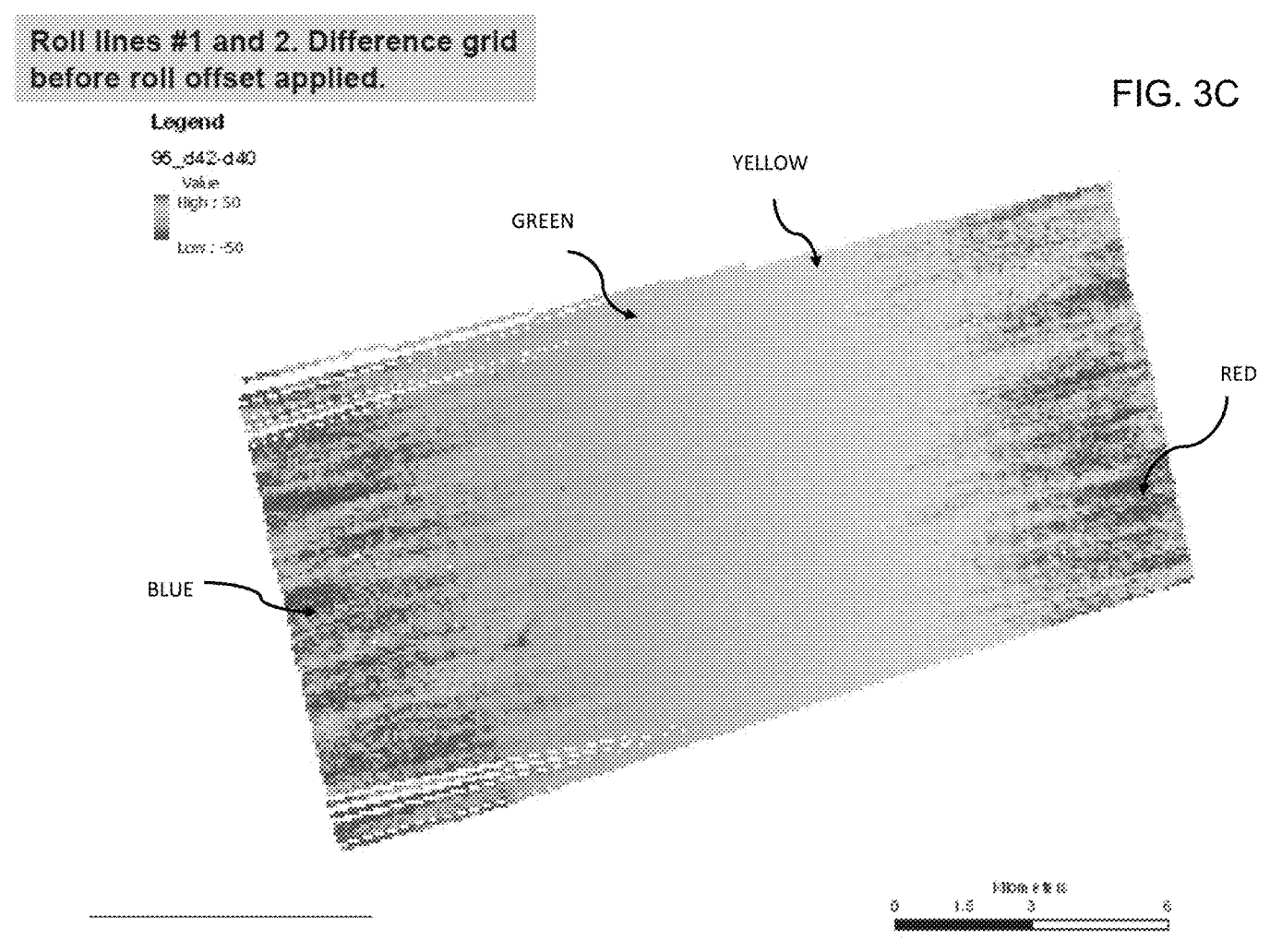
Figure 3D:
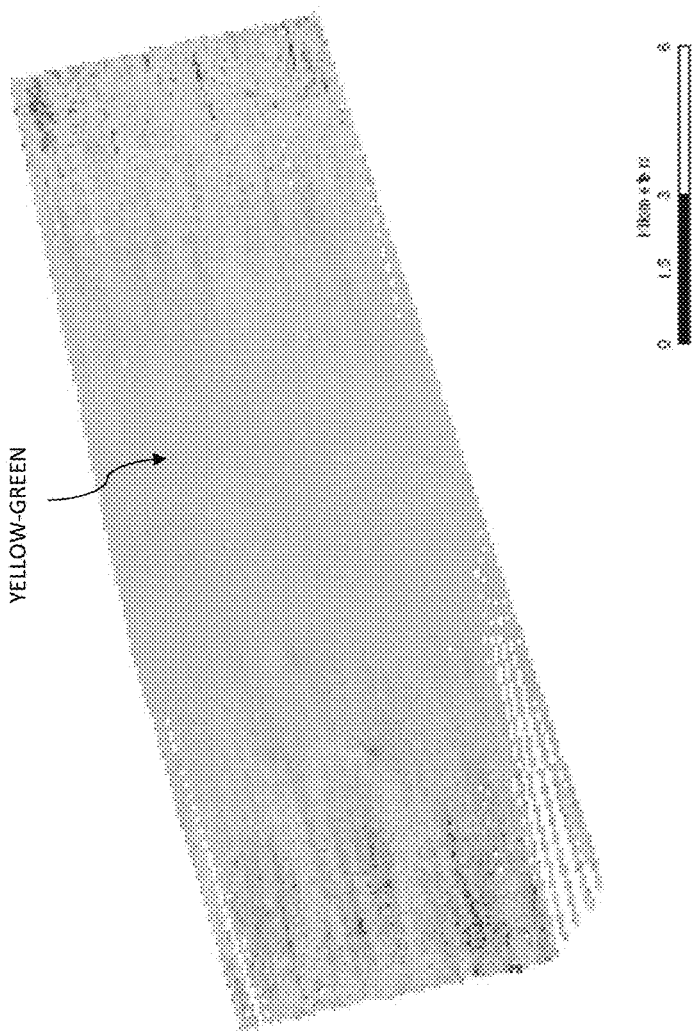
FIG. 3D shows the difference grid after an initial roll adjustment.

FIGS. 3A and 3B illustrate samples of first and second survey lines taken at opposite headings. A color scale of red to blue represents shallow to deep depths, respectively. The difference grid resulting from the subtraction of the survey lines of FIGS. 3A and 3B is shown in FIG. 3C. The presence of extreme values within the grid, represented by the dark areas on the image corresponding to blue at the left end of the grid and red at the right end, indicate the presence of a static roll bias. After application of a roll adjustment of −0.10°, the difference grid resulting from the subtraction of the first and second survey lines, shown in FIG. 3D, has very few dark areas and more uniform shading across the entire image (color would appear as yellow-green on the red to blue scale), indicating that appropriate roll correction has been applied. Using a grey scale, the corrected shading would be appear as medium grey, or 50% on a scale of white=0% and black=100%.

FIGS. 4A and 4B provide examples of first and second survey lines taken at opposite headings passing over an object 40 in order to determine whether a pitch bias is present. As in the roll bias analysis, a conventional color scale is used, with red indicating a shallower surface becoming deeper as the colors progress toward blue. A grey scale or other value, e.g., numerical, scale may be substituted, as will be apparent to those in the art.

Figure 4D:
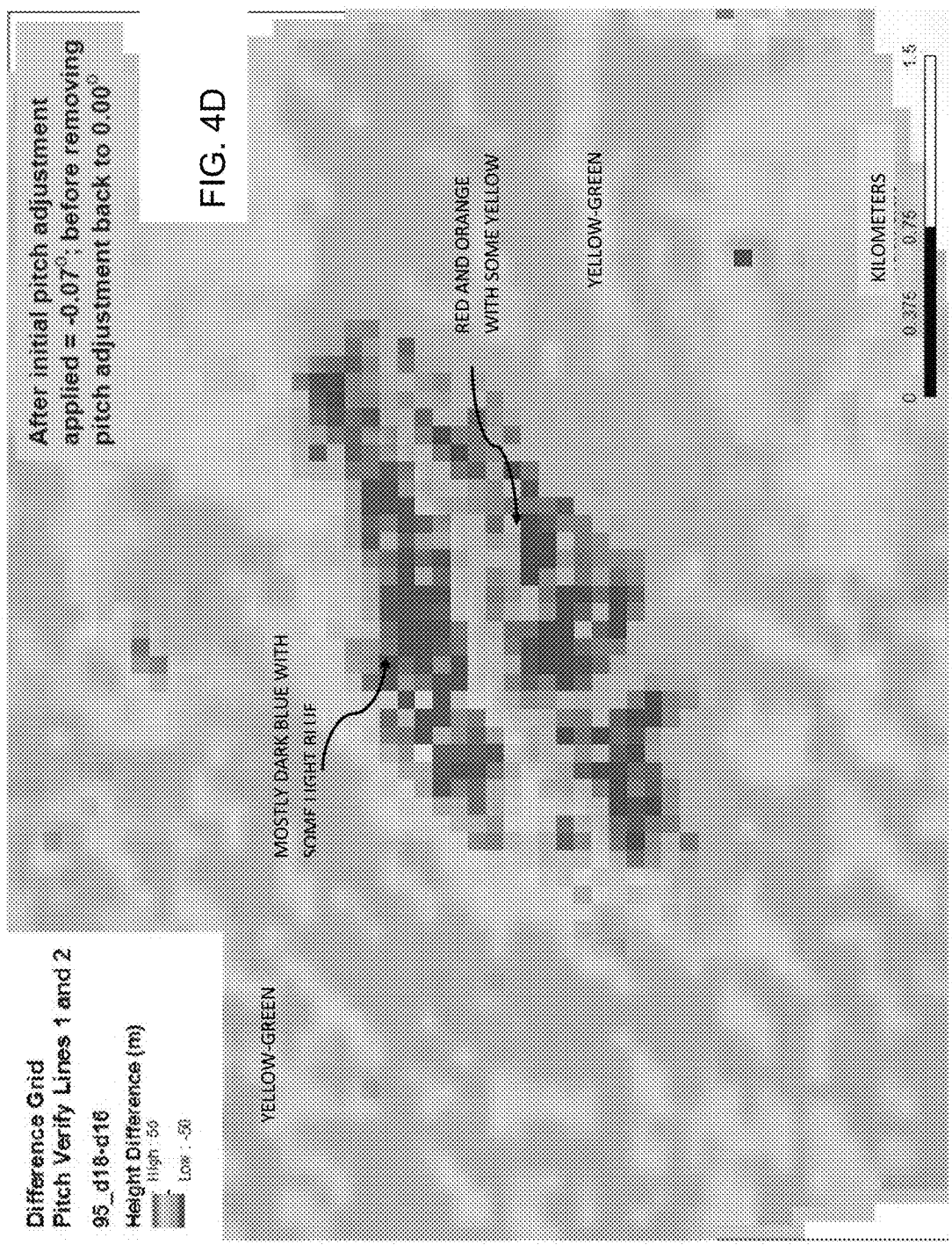
FIG. 4D shows the difference grid produced after an initial pitch adjustment that was selected based on the conventional profile offset approach shown in FIG. 4E.
Figure 4E:
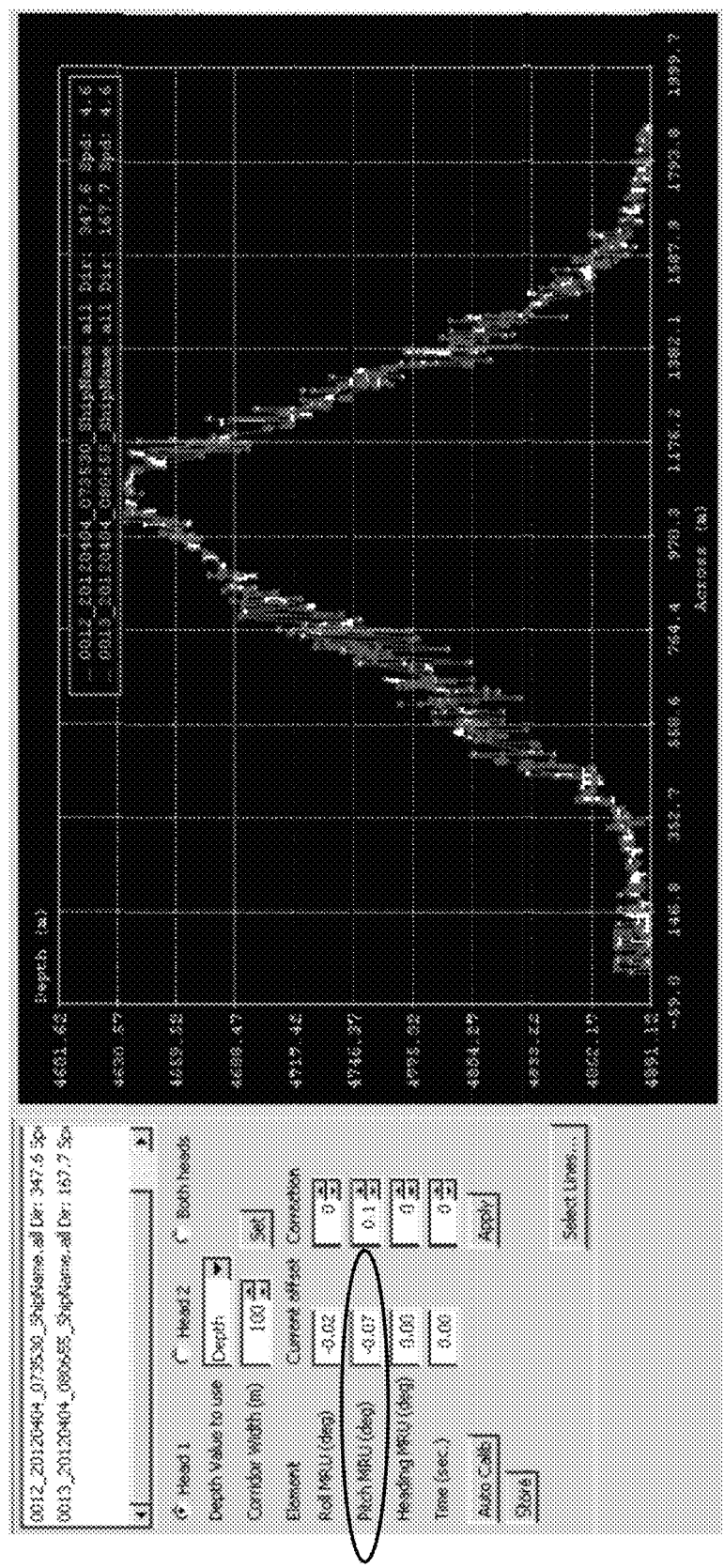
FIGS. 4A and 4B show the reciprocal survey lines to be used in a pitch calibration according to the present invention.
FIG. 4C shows the difference grid generated prior to pitch adjustment.

FIG. 4C shows the difference grid produced by subtracting the survey lines of FIGS. 4a and 4B. A slight offset is revealed with no correction applied, with the lower half of the object appearing to be slightly negative (a mix of light blue with a few scattered dark blue patches) and the upper half of the object appearing to be zero to slightly positive (mostly yellow with scattered patches of orange and light blue.) Based on determinations made by skilled personnel using the conventional profile-based approach of shifting plots of the two survey lines until they appear to be aligned, an offset of −0.07° in the pitch was indicated. FIG. 4E provides a screen shot showing the approximate alignment of the two profiles with a readout (circled) of −0.07° adjustment made to the pitch MRU. In the figure, the two profiles are shown as white and grey lines. These lines are frequently colored red and blue to facilitate visualization by the system user. As demonstrated by the noisy profiles, determination of the optimum alignment is subjective test, relying on the judgment and visual acuity of the user. After a correction of +0.07° was made to the pitch, the reciprocal lines were re-shot, and the difference grid of FIG. 4D was generated. The increased sensitivity of the difference grid revealed significant height differences across the object at the "corrected" pitch, with the upper half of the object indicating a relative low (negative; mostly dark blue with some light blue) value and the lower half of the object showing a high (positive; red and orange with some yellow) value. Based on the significant amount of bias introduced by the erroneous adjustment, the pitch was adjusted back to 0.00°, producing the more balanced difference grid of FIG. 4C.

Figure 5B:
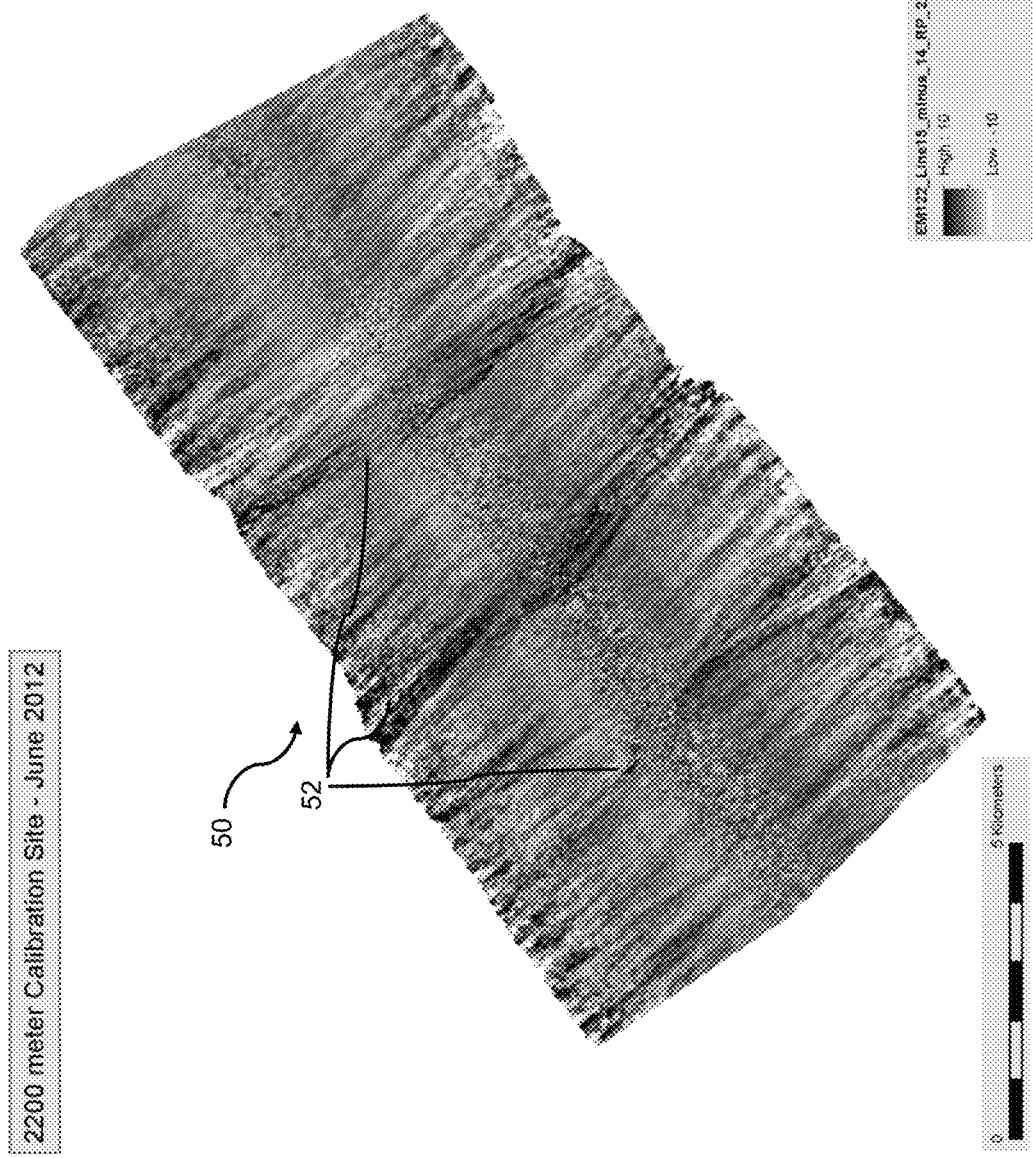

FIGS. 5A and 5B illustrate a grey scale difference grid, where a low (negative) value appears as white and a high (positive) value is shown as black. The three dark stripes running 52 across the difference grid 50 of FIG. 5A correspond to positive artefacts on the southwest-facing side of anticlinal ridges with a pitch correction of +0.68° and roll correction of −0.70°. This indicates that the vehicle is pitched up and requires a negative pitch adjustment (moving the bow down in a right-hand-rule sign convention) to correct it. The difference grid of FIG. 5B was generated following a pitch adjustment of −0.38° from the previous shot, i.e., +0.3°. With the adjustment, the positive artefacts 52 are reduced but still visible, indicating the need for additional negative pitch correction. With a pitch adjustment to +0.16°, there is no discernible difference on opposing sides of the ridge, indicating that no additional pitch correction is required (see FIG. 6B).

The same pair of survey lines used for pitch correction can be used to perform a quality control test on the roll calibration. The user can use this opportunity to refine the roll correction, using the pattern of "high" values on one side of the survey line, and "low" values on the other side, to calibrate the system to the point where the pattern disappears, even if there is noise ("speckle") in both of the surveys. Note the lack of change in greyscale from the center line to the edges of FIG. 5B, indicating that the roll is very well calibrated.

Once static biases have been corrected, difference grids can be used to detect extremely subtle differences in the transducer array, which can lead to vertical biases in the calculated seafloor depth of much less than 1/10th of 1%. On FIG. 5B, the very subtle "striping" parallel to the ship track direction, visible as the alternating bands (from upper left [NW] to lower right [SE]) of slightly darker grey—slightly lighter grey—slightly darker grey—slightly lighter grey, is due to very slight differences in the echo sounder system (hardware or firmware), that result in a very slight shift in calculated depth as a function of transducer element/sub-array detection and/or depth calculation. These subtle shifts would typically not be observable without a difference grid approach. Difference grids can therefore be used to evaluate and trouble shoot transducer/system performance.

Figure 6A:
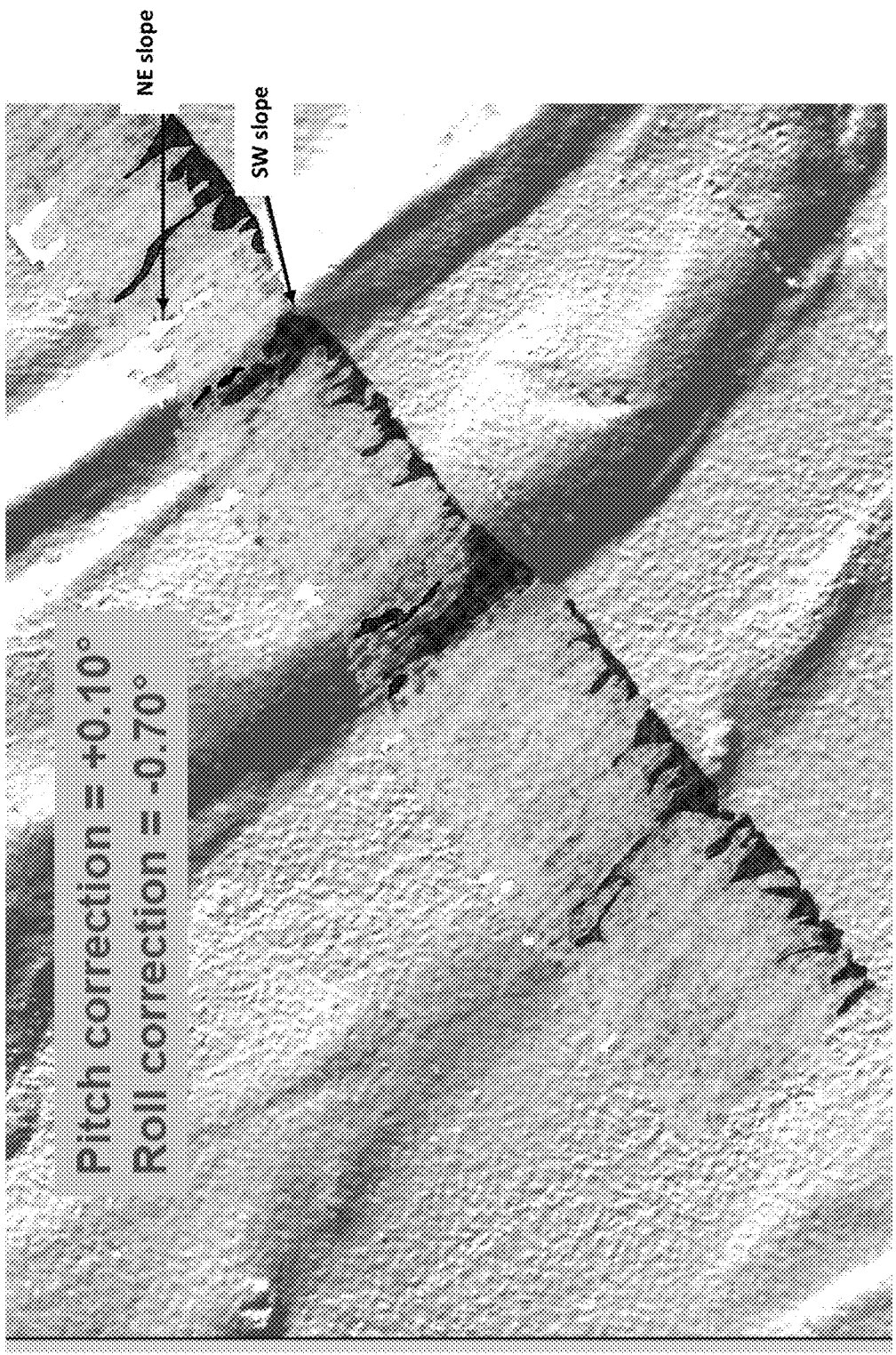

FIG. 6A shows a difference grid for determining static heading bias. The northeast facing slope of the anticlinal ridge shows from northwest to southeast positive to no artefact (indicated by the white areas). The southwest-facing slope shows no artefact to negative (indicated by the dark areas.) This indicates that the heading is biased counter-clockwise and requires adjustment in a clockwise direction. This is achieved by turning to starboard looking down, or a positive heading correction in a right-hand-rule sign convention. FIG. 6B provides the difference grid generated following a heading adjustment of +0.19°. The roll and pitch corrections determined from the prior difference grids are maintained, resulting in a well calibrated system.

FIGS. 7A and 7B provide examples of first and second survey lines ("Gyro line #1" and "Gyro line #2") taken on the same heading, but offset to pass over an object 70 in order to check for the presence of a static heading bias. The two offset lines were acquired in such a way that object 70 was imaged by the port-side outer beams of the first line, and the starboard-side outer beams of the second line. To assist with visualization using the grey scale image in the figures, approximate outlines of the different depth values on a color scale are drawn and the areas labelled with the corresponding color that would appear in a color image. On the color scale, red corresponds to a high value (shallower) and blue to a low value (deeper).

FIG. 7C shows the difference grid generated for the survey lines of FIGS. 7A and 7B. The dark patches 72 at the lower half (southeast side) of the object correspond to dark blue on the color scale, indicating a negative height difference. The light grey patches 74 on the northwest side of the object correspond to red on a color scale, indicating a positive height difference. The clear visual distinction between the opposite sides of the sail line allowed the user to estimate that a positive heading adjustment was appropriate (to starboard looking down in a right-hand-rule sign convention). The difference grid shown in FIG. 7D was generated after a heading correction of +0.02° was applied. The result is a relatively uniform distribution of high and low values with no clear side-to-side imbalance relative to the sail line.

Figure 8A:
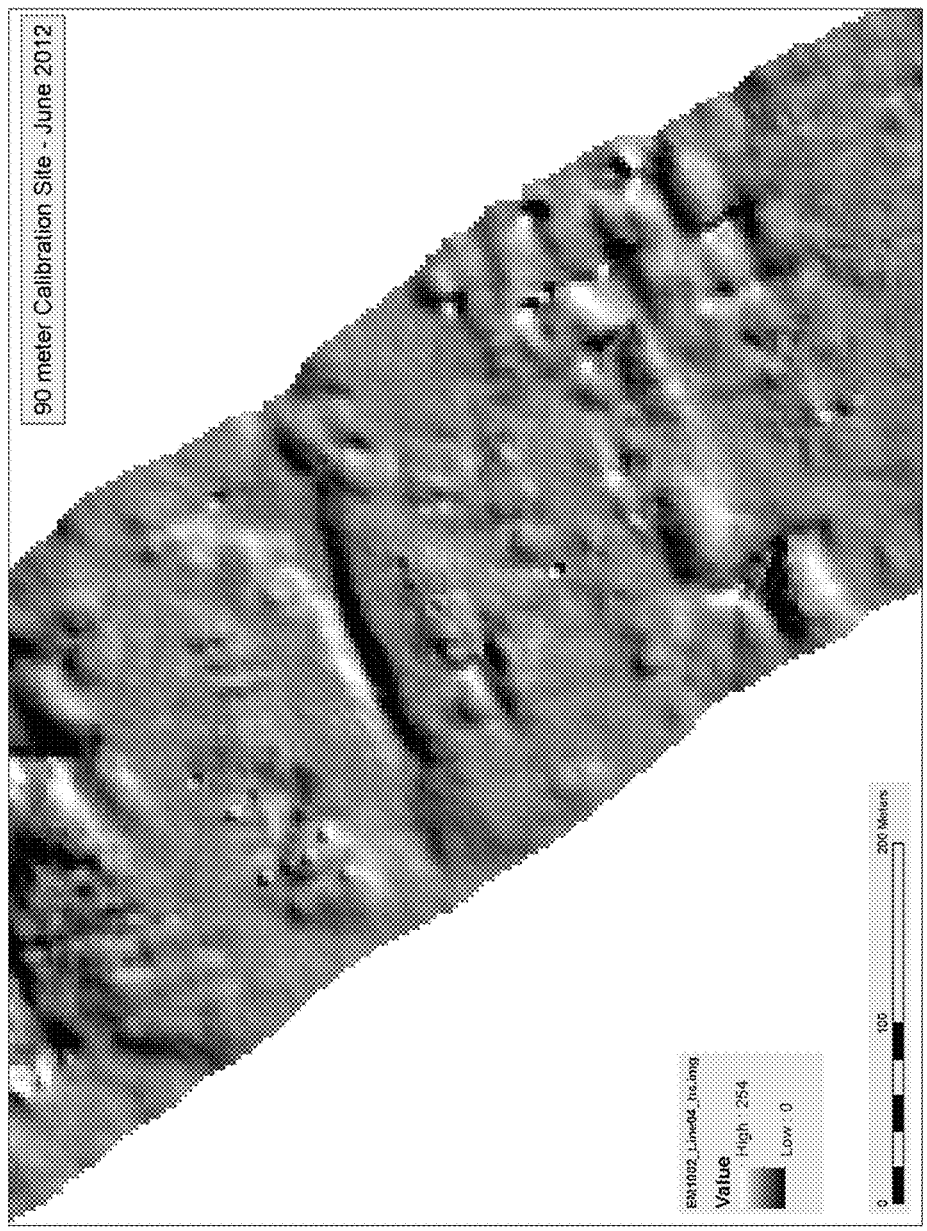
FIG. 8A is a survey line taken across a prominent feature for latency measurement.
Figure 8B:
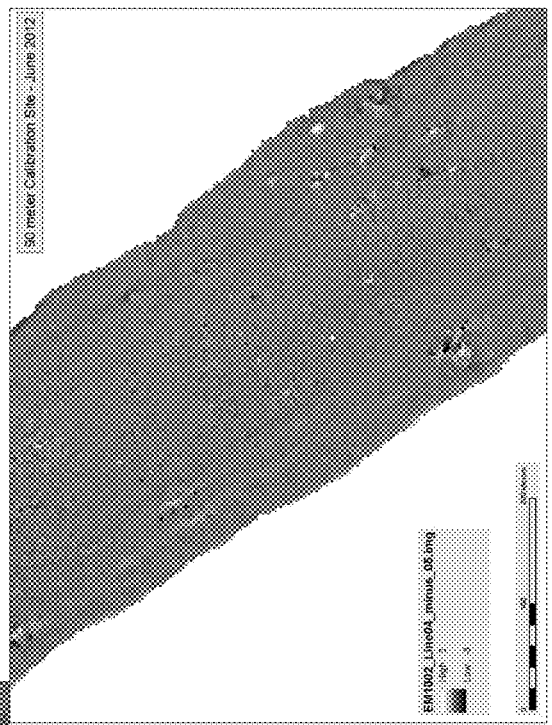
FIG. 8B is a difference grid showing a 1 second time delay.
Figure 8C:
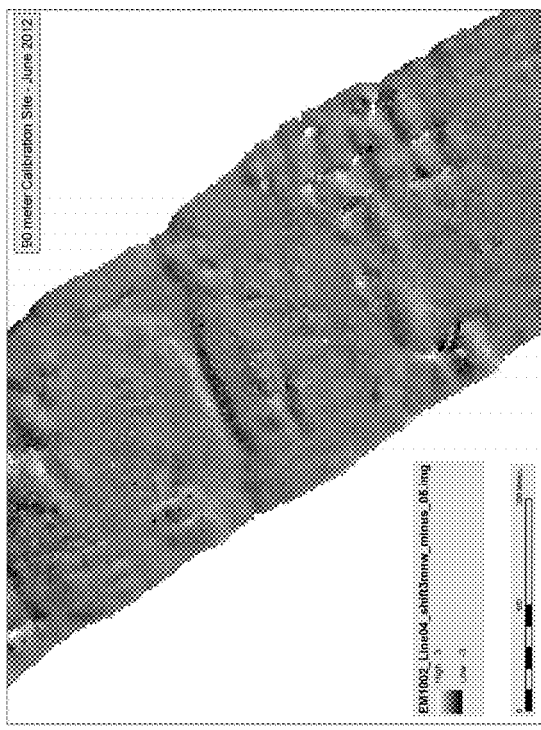
FIG. 8C is the difference grid after adjustment for the time delay.

For determination of time delay offset, the first and second survey lines follow the same line in the same direction, but are run at two different speeds over an object (elongated feature) used in the above-described tests. If there is a time delay in the system, the difference grid resulting from the subtraction of the first and second survey lines will display the elongate feature "shifted" forward or back, and the difference surface will show "high" (positive) values on one side of the sail line, whereas the other side will show "low" values. With time delay, FIG. 8A shows a feature survey in shallow (62 m) water. Two lines acquired over this feature in the same direction, with the same center line, at two different speeds, would show a "shift" in the seafloor if there is a time delay in the system. A line shot at 12 knots=6 meters per second, vs. 6 knots=3 meters per second, would show an apparent shift of the ridge on the seafloor of 3 m for a 1 second time delay. FIG. 8B shows the difference grid resulting from the subtraction of two such lines, showing a "low" (negative) value on the south-eastern face of the ridge, and a "high" (positive) value on the north-western face of the ridge due to the 1 second time delay. As with the previously described examples, the user can use the height difference of the difference survey and depth along the sail line to calculate a correction. Alternatively, the user can enter a correction value into a real-time calibration routine capable of correcting both surfaces to observe whether the difference grid improves (both high and low values decrease at a given offset) or degrades (both high and low values increase at a given offset). FIG. 8C shows the difference grid between the two lines where there is no time delay artefact.

The difference grids described herein can be the original basis for determining the setting for calibrating an echo sounding system. Alternatively, the difference grids can be used to confirm or adjust corrections that have been determined using a conventional profile comparison or corrections determined by a quantitative error minimization of the seafloor in common between two surveyed lines as described by Bjorke International Patent Publication WO2003/065073.

Figure 9:
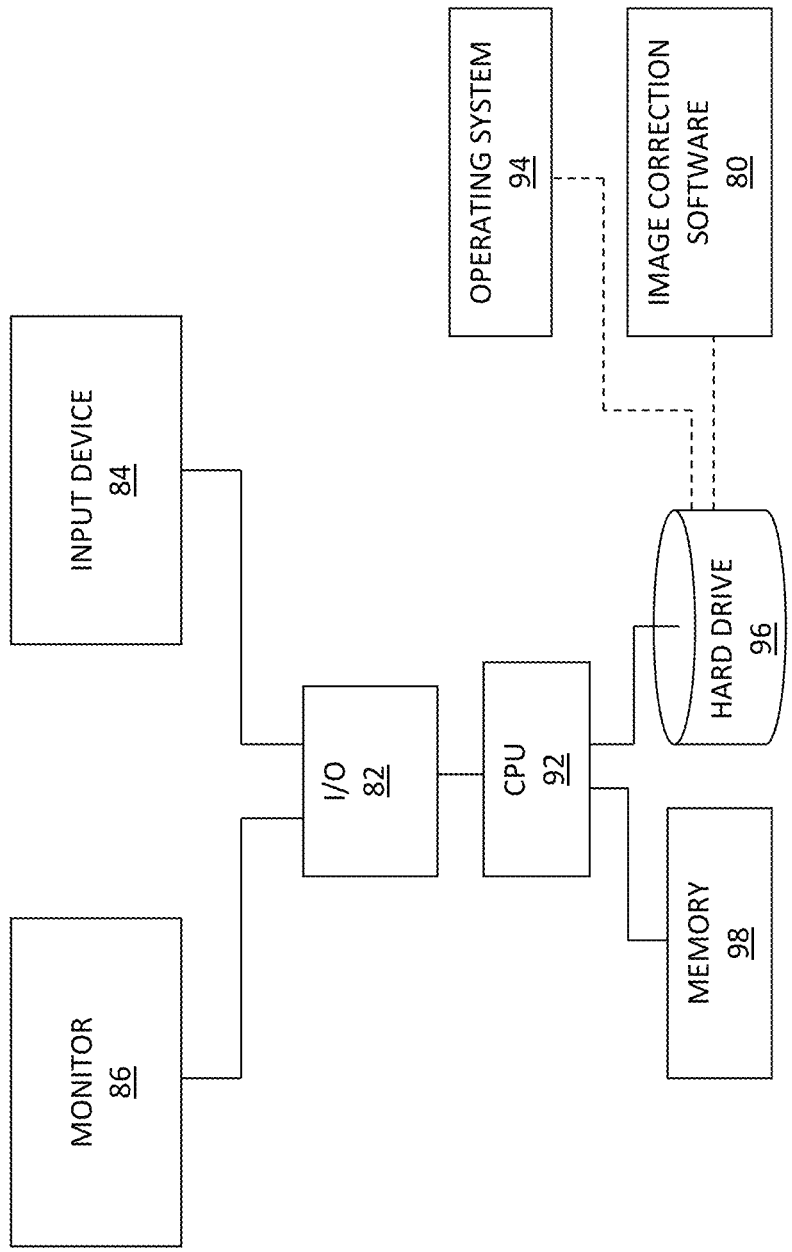
FIG. 9 illustrates a computer system arranged to perform a method according to an embodiment of the invention.

FIG. 9 illustrates an exemplary computer system that may be used to perform a method according to an embodiment of the invention. The computer system comprises a central processing unit (CPU) 92, operating system software 94, a hard drive 96 (or flash memory or other storage medium in which processing software resides), memory 98 for storage of raw data, processed images and results, an in/out (I/O) system 82, and image processing software 80. In this embodiment, the image processing software 80 comprises a computer program, or a suite of computer programs operable to receive the returned acoustic signals, convert the signals into a model (2D or 3D) of the scanned surface, calculate and display depths and difference grids, etc. The I/O system 82 is connected to input devices 84 (e.g., receivers) and a monitor 86 (or other graphical user interface (GUI)), which is operable to display images before and after processing. Additional output devices may include a video recorder for creating a permanent or semi-permanent record of activity over time. Input devices may include a keyboard, a mouse, an electronic pen, or a haptic device, which may be used to select and manage images for correction according to an embodiment of the invention.

The computer system may operate in a networked environment using logical connections to one or more remote computers, such as a personal computer, a hand-held device, a server, a router, a network PC, a peer device or other common network node. Such networking environments are commonplace in offices, on ships, enterprise-wide computer networks, intranets and the Internet.

The inventive grid-based approach uses all of the data in the swath surveyed in common between two lines compared with the narrow profile used in corridor-based methods. Because random noise impacts a grid far less than a narrow corridor, the inventive surface (grid)-based calibration allows for very accurate calibration beyond what is typically achievable with corridor calibration approaches that are currently in use.

In another aspect of the invention, improved seafloor imaging capability can be achieved by acquiring multiple overlapping lines to improve the signal-to-noise ratio on the backscatter data beyond the bandwidth-controlled theoretical achievable resolution. The resulting dramatic improvement in resolvability provides the ability to identify a relatively small feature on the deep seafloor with a hull-mounted system on a surface ship. An exemplary application would be the location of a wrecked ship or crashed plane on the ocean floor. Another exemplary application would be use of a hull-mounted system on a surface ship to map the accurate location and areal distribution of infrastructure (pipelines, flowlines, wells, anchors) in an offshore oil field development.

Figure 10A:
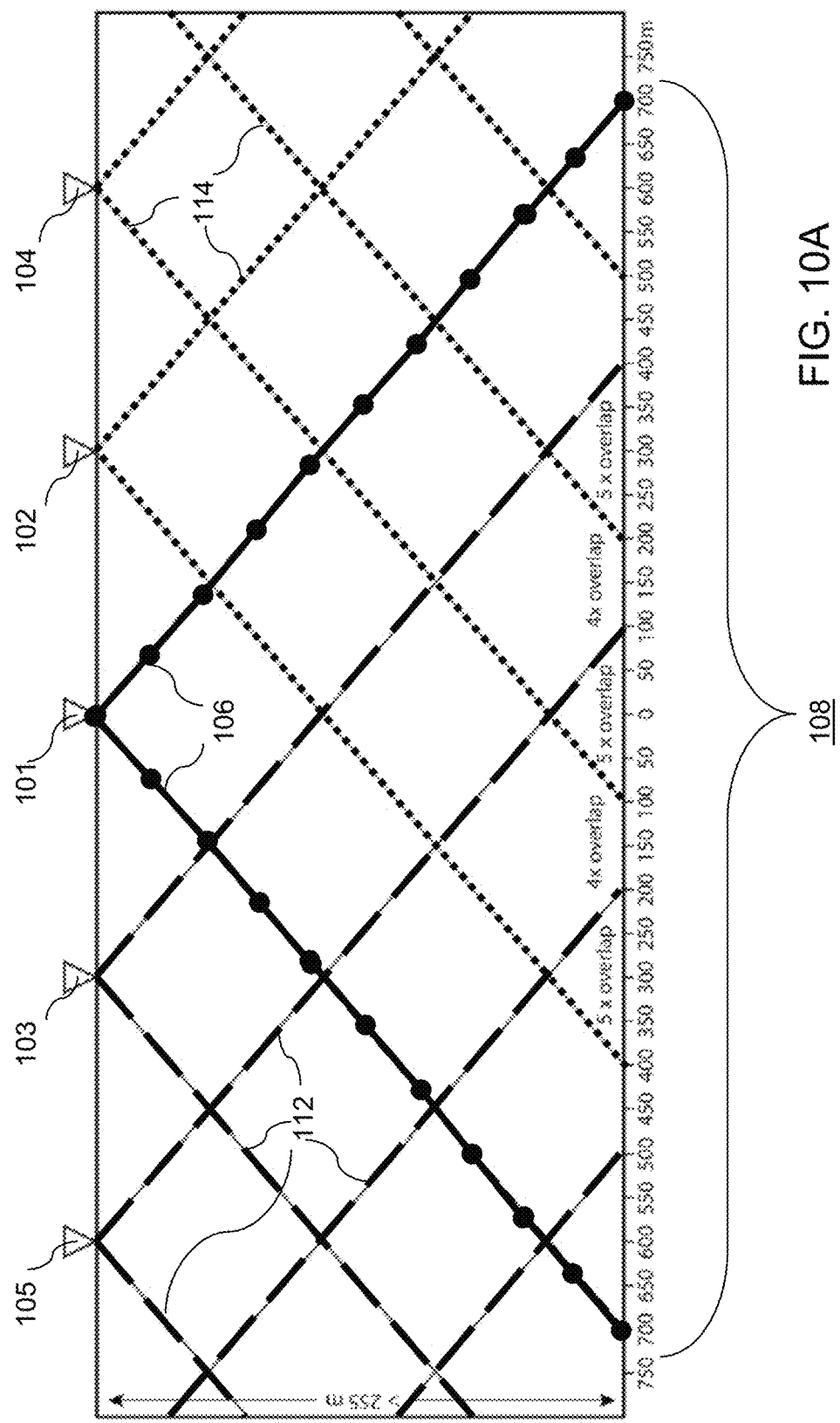

To increase sounding density, the inventive method employs a combination of closely spaced lines, extensive swath overlap, and less than typical acquisition speed (J. Kluesner and N. Maher, 2012). FIG. 10A illustrates an exemplary multibeam survey geometry for high resolution imaging (Kluesner et al., 2013, Appendix). Triangles 101-105 at the top of the box represent ship tracks (sail lines) spaced apart by a distance, in this case, 300 m. The result is to define a plurality of parallel sail lines that are laterally offset by a predetermined distance that results in overlap of the swaths. For example, when adjacent sail lines are defined by alternating reversals of headings, the port-side beam of one line will overlap the starboard-side beam of the next line taken at the opposite heading. Lines 106 trace the footprint of the central swath 108. Dashed and dotted lines 112 and 114 show swath overlap up to 700 m in both directions of sail line 101. At depths below 255 m, using a fixed 700 m port and starboard constrained swath width, the survey records 200 m wide seafloor patches of 5× overlap and 100 m wide patches of 4× overlap except near the edges of the survey, where overlap is reduced. The closely spaced survey lines allows for a 1.4 km fixed swath width (±700 m port and starboard).

Figure 10D:
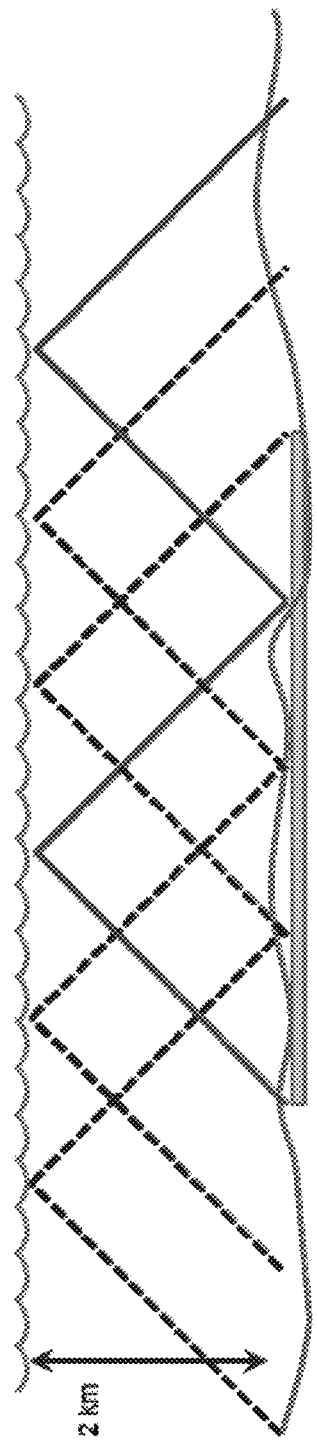
Figure 10E:
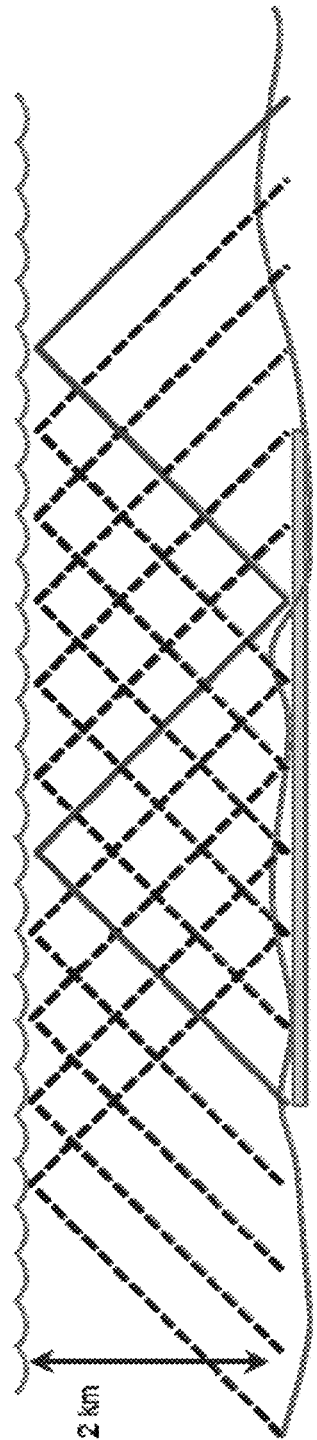

FIGS. 10B-10E provide a comparison of different survey geometries. FIG. 10B illustrate a 1× coverage with fixed swath width (in this example, 4.5 km) and minimal overlap. The diagram in FIG. 10C shows 2× coverage, with the same primary lines (solid lines) shown in FIG. 10B and adding secondary lines (dashed lines) which are acquired so that the outer beams of the secondary lines overlap the nadir stripe of the primary lines. For a fixed swath of 4.5 km, this overlap is achieved by acquiring the secondary lines at 2.25 km offset from the primary line. FIG. 10D provides an example of 3× coverage, which is achieved by spacing the primary (solid) and secondary (dashed) lines 1.5 km from each other. This line plan is configured so that every patch of seafloor is imaged by three swaths. FIG. 10E illustrates 6× fixed swath coverage, in which the lines (primary (solid) and secondary (dashed)) are spaced 750 m apart.

Overlapping, fixed-width swaths in combination with high-density beam-forming produce an image with high sounding density. Using the foregoing example, selection of appropriate fixed swath widths and amount of overlap to achieve a desired level of resolvability is within the level of skill in the art. The improvement in resolvability can be further enhanced by using a multi-ping mode, which doubles the number of soundings per ping cycle, thus doubling the density of along-track soundings. Resolvability can be further improved by decreasing the vessel speed, which will increase the along-track sounding density (J. Kluesner and N. Maher, 2012).

Use of fixed swath width mode is unusual because most multibeam surveys attempt to maximize the area covered per unit time, typically at the expense of the much higher sounding density that the system is capable of achieving. By fixing the receiving swath width, all receiving beams can be focused into the 1.4 km swath, decreasing the across-track receiving beam spacing and increasing the sounding density. At depths greater than 255 m the receiving across-track beam spacing for the constrained swath width (1.4 km) remains constant at 4.9 m, whereas in unconstrained swath mode sounding spacing would increase linearly up to 49.6 m at 2600 m (average depth of trench within survey). The cycle time required to receive the outermost sounding return is much less than in unconstrained mode, which decreases the time between pings. The faster ping repetition rate in constrained mode reduces along-track beam spacing. Beyond 255 m, which has an along-track beam spacing of 2.04 m, constrained swath along-track beam spacing increases linearly to 7.4 m at 2600 m, while unconstrained swath along-track beam spacing increases linearly to 20.9 m at 2600 m. Using constrained mode all soundings are forced into the 1.4 km fixed swath instead of being spread across the wider unconstrained swath width (~14.3 km at 2600 m). Constrained mode thus provides an across-track sounding increase of over 1,000% within the central 1.4 km of seafloor at 2600 m (Kluesner et al., 2013, Appendix).

Using the sample parameters described above, at depths greater than 255 m multibeam swaths overlap 4 to 5 times, allowing the grids to be formed using smaller and smaller cell sizes, thus greatly increasing the sounding density and geologic resolvability of the data. The example overlap of 4 to 5 times is provided only as an example and the inventive method is not limited to such levels of overlap. In fact, the biggest improvement in quality is seen from 1× to 2× coverage. In deep water tests a modest improvement in bathymetric resolvability is found between 1× and 2×, with less improvement at each step beyond 2×. In backscatter however, a dramatic improvement in resolvability occurs between 1× and 2×, with significant improvements at 3× and 6×. At 6×, and with a fixed 4.5 km swath, and 6× overlap with lines spaced 300 m apart, we have achieved a 3 m×3 m bathymetric bin size, with a 1 m×1 m backscatter pixel.

FIGS. 11A and 11B illustrate the difference in resolvability between no swath overlap (FIG. 11A) and 4-5 times overlap (FIG. 11B) (Kluesner et al, 2013). Actual sail line spacing could vary throughout a survey due to currents affecting hydrophone streamer position. As a result, small patches having slightly less than 4 to 5 times overlap may be defined, while other patches may have slightly more overlap. Based on the foregoing examples, a person of skill in the art would be able to design a survey and fix the swath width and control the line spacing to achieve the desired amount of consistent overlap. As will be readily apparent to those in the art, the amount of overlap will vary with depth once the water depth is shallower than depth at which the maximum achievable take-off angle is equal to the fixed swath, and there will be no overlap in shoals above a certain threshold. For the example illustrated in FIG. 10A, no overlap would occur above approximately 27 m.

Figures 12A, 12B:
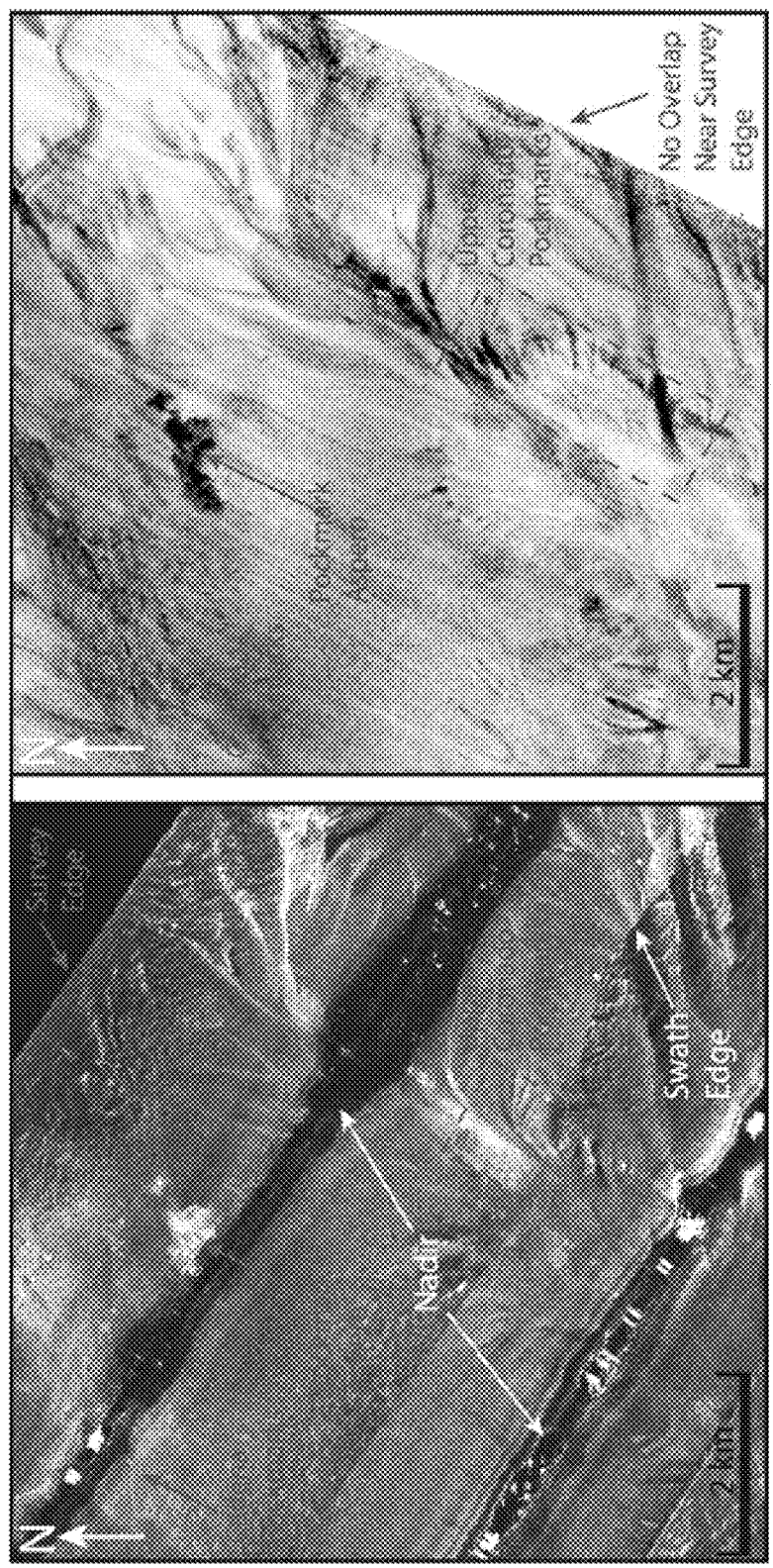
FIGS. 12A and 12B are images of a seafloor region generated from deep-towed side-scan data and a backscatter mosaic with 4-5 times swath overlap, respectively.

The backscatter data from overlapping swaths can be averaged, dramatically improving the mosaic by decreasing noise (speckle), eliminating the nadir stripe, and decreasing the locational uncertainty of anomalies. This technique further reduces the effects of angular response (e.g., steep slopes), seabed grazing angles, and beam pattern residuals. Such effects can be seen in shallow water and at the edges of the survey, especially along steep slopes, where there is limited or no swath overlap. Compared to conventional multibeam bathymetry, the high geologic resolvability of overlapping multibeam datasets increases the continuity of the seafloor structures because the threshold for detection is much lower. Because backscatter can have positional ambiguity, and can be contributed to by the entire seafloor within the insonified area (beam footprint), single swath backscatter can have both noise and positional uncertainty. By summing the backscatter of overlapping swaths, the signal (if positionally correct) will increase and converge on the actual positional location of the source of the backscatter, but decrease if positionally incorrect. Furthermore, the signal will increase, and the noise will decrease, with additional overlap. Increasing coverage density from 1× to 2× produces a dramatic increase in resolvability. Additional multiples of coverage density improves resolvability somewhat, but significantly reduces noise. Backscatter mosaics made from overlapping swaths can be mosaiced at a significantly smaller pixel size than single swath backscatter, with the edges of anomalous backscatter features sharpening with increasing overlap. As illustrated by FIGS. 12A and 12B, the increased sounding density from fixed swath widths and 4 to 5× overlap (FIG. 12B) produces increased continuity and higher resolvability of structures on the backscatter image compared to data collected in the same area by a higher spatial and vertical resolution deep-towed side-scan system (FIG. 12A) (Kluesner et al, 2013).

REFERENCES

Godin, A. (1998). *The Calibration of Shallow Water Multibeam Echo-Sounding Systems*. M. Eng. report, Department of Geodesy and Geomatics Engineering Technical Report No. 190, University of New Brunswick, Fredericton, New Brunswick, Canada, 182 pp.

Herlihy et al., 1989, NOAA—Sea Beam "Patch Test" Manual: Ocean Mapping Section, Office of Charting and Geodetic Services, NOS, 34 pp.

Kluesner, J. W., Silver, E. A., Bangs, N. L., McIntosh, K. D., Gibson, J., Orange, D., Ranero, C. R., and von Huene, R., (2013) High Density of Structurally-Controlled, Shallow to Deep Water Fluid Seeps Imaged Offshore Costa Rica, G-cubed. Geochem. Geophys. Geosys. (G3), 14, doi: 10.1002/ggge.20058. With Auxilliary Material for Paper 2012GC004411R.

Kluesner, J. W, and Maher, N. M., (2012) "Bathymetry Data and Processing with Thanks".

Mann, Robert (1998) Field Calibration Procedures for Multibeam Sonar Systems. Army Topographic Engineering Center, Alexandria Va., United States; 14 pp.

The invention claimed is:

1. A method for visualizing an offset in static parameters in an echo sounding system, the method comprising:
generating survey lines as a plurality of pixels having pixel values;
generating a difference grid by subtracting pixel values for a first survey line from pixel values for a second survey line to determine pixel difference values at each point in the grid; and
displaying the difference grid on a display device, where the pixel difference values are represented in a visually-distinguishable scale of pixel values.

2. The method of claim 1, wherein the second survey line is taken at an opposite heading from the first survey line.

3. The method of claim 1, wherein the second survey line is taken at a same heading and a different speed than the first survey line.

4. The method of claim 1, wherein the second survey line is laterally offset from the first survey line and taken at the same heading as the first survey line, so that outer beams of the first survey line overlap outer beams on the opposite side of the second survey line.

5. The method of claim 1, wherein the visually-distinguishable scale is a color scale.

6. The method of claim 1, wherein the visually-distinguishable scale is a grey scale.

7. A non-transitory machine-readable medium comprising a plurality of instructions that in response to being executed result in a computing system:
receiving echo sounding data corresponding to each of a first survey line and a second survey line;
representing the echo sounding data for the first and second survey lines as pluralities of pixels having pixel values;
generating a difference grid by subtracting pixel values for the first survey line from pixel values for the second survey line to determine difference pixel values at each point in the grid; and
displaying the difference grid on a display device, where the pixel difference values are represented in a visually-distinguishable scale of pixel values.

8. The non-transitory machine-readable medium of claim 7, wherein the second survey line is taken at an opposite heading from the first survey line.

9. The non-transitory machine-readable medium of claim 7, wherein the second survey line is taken at a same heading and a different speed than the first survey line.

10. The non-transitory machine-readable medium of claim 7, wherein the second survey line is laterally offset from the first survey line and taken at the same heading as the first survey line, so that outer beams of the first survey line overlap outer beams on the opposite side of the second survey line.

11. The non-transitory machine-readable medium of claim 7, wherein the visually-distinguishable scale is a color scale.

12. The non-transitory machine-readable medium of claim 7, wherein the visually-distinguishable scale is a grey scale.

13. The non-transitory machine-readable medium of claim 12, wherein the instructions further cause the computing system to:
receive an adjustment to the static parameter; and
repeat the steps of generating and displaying after receiving the adjustment.

14. The non-transitory machine-readable medium of claim 12, wherein the instructions further cause the computing system to:
receive an adjustment to the static parameter; and
evaluate and troubleshoot transducer/system performance.

15. A system for visualizing an offset in static parameters in an echo sounding system, the system comprising:
a processor in communication with a plurality of acoustic sensors, the processor operable for executing a program to convert signals from the acoustic sensors into depth values, the processor further operable for:
receiving echo sounding data from the plurality of acoustic sensors corresponding to each of a first survey line and a second survey line, wherein the first and second survey lines are represented as pluralities of pixels having pixel values;
generating a difference grid by subtracting pixel values for the first survey line from pixel values for the second survey line to determine pixel difference values at each point in the grid; and displaying the difference grid on a display device, where the pixel difference values are represented in a visually-distinguishable scale of pixel values.

16. The system of claim 15, wherein the second survey line is taken at an opposite heading from the first survey line.

17. The system of claim 15, wherein the second survey line is taken at a same heading and a different speed than the first survey line.

18. The system of claim 15, wherein the second survey line is laterally offset from the first survey line and taken at the same heading as the first survey line, so that outer beams of the first survey line overlap outer beams on the opposite side of the second survey line.

19. The system of claim 15, wherein the visually-distinguishable scale is a color scale.

20. The system of claim 15, wherein the visually-distinguishable scale is a grey scale.

* * * * *